(12) United States Patent
Shelnutt et al.

(10) Patent No.: US 10,776,526 B2
(45) Date of Patent: Sep. 15, 2020

(54) HIGH CAPACITY, SECURE ACCESS, MOBILE STORAGE EXCHANGE SYSTEM

(71) Applicant: DELL PRODUCTS, L.P., Round Rock, TX (US)

(72) Inventors: Austin M. Shelnutt, Leander, TX (US); Edmond I. Bailey, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 185 days.

(21) Appl. No.: 15/962,897

(22) Filed: Apr. 25, 2018

(65) Prior Publication Data

US 2019/0332822 A1 Oct. 31, 2019

(51) Int. Cl.
| | |
|---|---|
| *G06F 21/79* | (2013.01) |
| *G06F 21/56* | (2013.01) |
| *G06F 13/16* | (2006.01) |
| *G06F 21/31* | (2013.01) |

(52) U.S. Cl.
CPC .......... *G06F 21/79* (2013.01); *G06F 13/1668* (2013.01); *G06F 21/31* (2013.01); *G06F 21/561* (2013.01); *G06F 2221/034* (2013.01)

(58) Field of Classification Search
CPC .... G06F 21/79; G06F 21/561; G06F 13/1668; G06F 21/31; G06F 2221/034; G06F 21/6218
See application file for complete search history.

(56) References Cited

U.S. PATENT DOCUMENTS

| | | | |
|---|---|---|---|
| 4,934,154 A | 6/1990 | Altoz et al. | |
| 5,253,484 A | 10/1993 | Corman et al. | |
| 6,233,160 B1 | 5/2001 | Shockley | |
| 6,581,544 B1 | 6/2003 | Smith | |
| 8,782,443 B2 | 7/2014 | Belady et al. | |
| 9,001,505 B2 | 4/2015 | Moore et al. | |
| 9,027,326 B2 | 5/2015 | Martin et al. | |
| 9,278,303 B1 | 3/2016 | Somani et al. | |
| 9,745,960 B2 | 8/2017 | Dietzel | |
| 9,763,365 B2 | 9/2017 | Stöcker et al. | |
| 9,814,160 B2 | 11/2017 | Slessman et al. | |
| 10,440,863 B1 * | 10/2019 | Shelnutt | H05K 7/1497 |
| 2006/0030253 A1 | 2/2006 | Asai et al. | |

(Continued)

*Primary Examiner* — Matthew Smithers
(74) *Attorney, Agent, or Firm* — Isidore PLLC

(57) ABSTRACT

A mobile data storage system includes a volumetric container of a mobile data center having IT equipment operating therein and an on-board high capacity storage (HCS). A storage compartment is configured within the container and is accessible from an exterior of the container. The storage compartment includes a plurality of individual storage slots each providing a docking port for connecting a removable data storage device (RDSD). At least one RDSD is inserted into a first storage slot of the plurality of storage slots. The RDSD facilitates rapid transfer of data to the MDC from edge data acquisition systems and to a data center facility. A management information handling system (IHS) is communicatively coupled to the HCS and to each docking port. The management IHS is configured to detect insertion of an RDSD into a docking port and coordinate a transfer of data from the RDSD to the HCS.

20 Claims, 18 Drawing Sheets

(56) References Cited

U.S. PATENT DOCUMENTS

| | | | |
|---|---|---|---|
| 2006/0082263 A1* | 4/2006 | Rimler | B60P 3/14 312/201 |
| 2008/0123288 A1* | 5/2008 | Hillis | H05K 7/1497 361/679.34 |
| 2010/0170277 A1* | 7/2010 | Schmitt | H05K 7/20745 62/259.2 |
| 2011/0264927 A1* | 10/2011 | Dearborn | G06F 1/1632 713/300 |
| 2012/0226922 A1 | 9/2012 | Wang et al. | |
| 2013/0328395 A1 | 12/2013 | Krizman et al. | |
| 2015/0086017 A1* | 3/2015 | Taylor | H04W 12/04 380/270 |
| 2016/0102880 A1 | 4/2016 | Lovicott et al. | |
| 2016/0198593 A1 | 7/2016 | Schmitt et al. | |
| 2016/0231043 A1 | 8/2016 | Casasanta et al. | |
| 2016/0376910 A1 | 12/2016 | Sellers et al. | |
| 2017/0223867 A1* | 8/2017 | Magcale | B63J 2/12 |
| 2017/0270314 A1 | 9/2017 | Tsybrovskyy et al. | |

\* cited by examiner

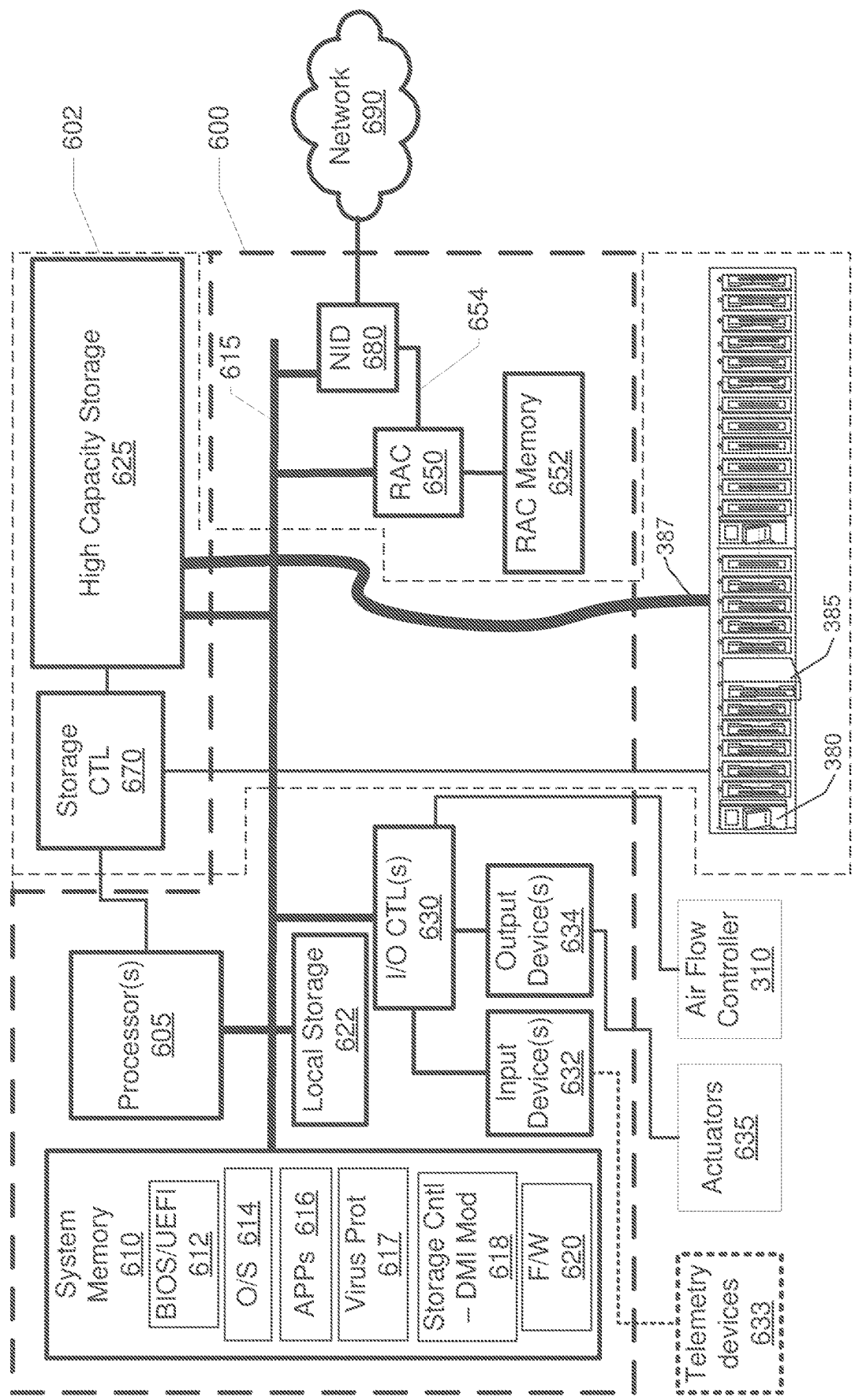

HIGH CAPACITY, SECURE ACCESS, MOBILE STORAGE EXCHANGE SYSTEM

BACKGROUND

Technical Field

The present disclosure generally relates to data storage systems and in particular data storage systems that support removable and interchangeable data storage devices in mobile data centers.

Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems (IHSs) may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSs utilize data to perform processing operations. Conventionally, the data is provided to the processing devices on a storage medium or device. The data is often compiled and/or collected locally by a data collection device and stored on a local data storage device. Often, large amounts of data that is remotely collected has to be transmitted to a remote data center for processing of the data by the data center. A networked transmission necessitates access to a high bandwidth uplink network, and the cost associated with transmitting such large quantities of data can be astronomical, and in some instances prohibitive. Alternatively, companies that consume the data may opt to have the data collector mail the data storage device to a collection point or to the data center location, where a technician can retrieve the storage device and eventually access the data stored thereon. The timing of the data upload may be days or longer from the time the data was collected. The above described data collection methods are filled with inefficiencies and security risks.

BRIEF SUMMARY

Disclosed are a mobile data storage exchange system (MDSS) and method for operating a MDSS. According to a first aspect, the MDSS includes a mobile data center (MDC) comprising a volumetric container having at least one information technology (IT) equipment operating therein, the at least one IT equipment including at least one information handling system (IHS). The MDSS includes a storage compartment configured within the volumetric container and accessible from an exterior of the volumetric container. The storage compartment provides/includes a plurality of individual storage slots each providing a docking port for connecting a removable data storage device (RDSD). The docking connection enables access, by one or more of the at least one IHS, to data stored on the RDSD. At least one RDSD is inserted into at least a first storage slot of the plurality of storage slots. The RDSD is a removable high-density storage device that facilitates rapid transfer of data to the MDC from edge data acquisition systems and eventually to a data center facility. The MDSS also includes an on-board high capacity storage and a management IHS that is communicatively coupled to the high capacity storage and to each docking port. The management IHS executes a data management and integration (DMI) module that configures the management IHS to detect insertion of a RDSD into a docking port and coordinate a transfer of data from the RDSD to the on-board high capacity storage. The MDSS also includes a high capacity onboard storage and a high bandwidth upload system bus (HBUS) communicatively coupling data connections within the docking ports to the high capacity on-board storage for efficient data upload from the RDSD inserted into the docking port.

The DMI module further configures the management IHS to, in response to detecting insertion of the RDSD, initiate a security protocol to confirm the RDSD does not have corrupted data or malware, the security protocol including running a virus scan on the RDSD prior to transferring the data to the on-board high capacity storage. The DMI module further configures the management IHS to trigger at least one of the IT equipment to initiate processing of the data retrieved from the RDSD. Data is automatically processed within the mobile data storage exchange system while the MDSS is operating in the field.

According to one aspect, the DMI module further configures the management IHS to detect a connection of the on-board high capacity storage with a facility management IHS, confirm that the detected facility management IHS is a verified data aggregation/download device, and enable the facility management IHS access to retrieve, copy, and/or manipulate the data stored on the on-board high capacity storage. To facilitate this transfer, the MDSS also includes a high bandwidth download System/Bus (HBDS) port communicatively coupled to high capacity on-board storage and which enables coupling to a high bandwidth data bus to facilitate data download to a facility storage. In one embodiment, the HBDS port is located on an exterior-surface of the container for easy access and connectivity.

The MDSS further includes a first storage access panel having a locking mechanism. The storage access panel is a hinged door of the storage compartment, in one embodiment. The locking mechanism is communicatively coupled to a security access pad that enables entry of access information by a user to open the hinged door and access an interior of the storage compartment. The access to the interior of the storage compartment is provided only in response to receipt and verification of an entry of the access information at the first security access pad. The MDSS also includes a second security access pad communicatively coupled to a locking mechanism of each docking port. The second security access pad enables a user to enter unique access data required to open the locking mechanism for a particular docking port of the plurality of docking ports and release a corresponding RDSD held within the particular docking port.

In one embodiment, the MDSS also includes a visual indicator associated with each docking port. The visual indicator enables communication of a status related to the storage device. The status can be one from among (i) unlocked and ready for removal, (ii) ready for MDSM insertion, (iii) data transfer completed, (iv) device non-functional or corrupted.

According to one embodiment, the MDSS further includes a security algorithm executed on the management IHS. The security algorithm configures the MDSS to detect entry of an access request at the security access pad, compare the access request and unique access code to pre-established combinations of unique access codes and specific RDSDs of the plurality of RDSDs, and in response to verifying the combination of unique access code and specific RDSD is a correct combination, unlock the docking port of the particular RDSD and signal an unlocked status of the particular RDSD. The access request includes a unique access code for accessing a particular RDSD and the unlocked status enables physical removal of the particular RDSD and insertion of a replacement RDSD into the docking port.

According to one embodiment, the MDC is a velocity cooled ('C) MDC that includes a ram air cooling system, which provides a flow of cooling air across the storage compartment and the high capacity storage (HCS) to maintain the RDSDs and HCS within an operating temperature range during data transfer and data processing operations.

According to a second aspect, the method enables mobile collection and processing of in-field collected data. The method includes detecting entry of an access request at a security access pad of a storage compartment configured within a container housing of a MDC. The MDC has at least one IT equipment operating therein. The storage compartment is a part of a MDSS of the MDC, and the access request includes a unique access code for accessing a removable data storage device (RDSD) from among multiple RDSDs housed within the storage compartment. The method includes comparing the access request and unique access code to pre-authorized unique access codes that allow access to remove and/or insert an RDSD at the storage compartment, and in response to verifying the entered unique access code matches one of the pre-authorized unique access codes, unlocking the docking port of a particular RDSD and signaling an unlocked status of the particular RDSD. The unlocked status enables physical removal of the particular RDSD and insertion of a replacement RDSD into the docking port. The signaling includes providing a visually detectable signal to indicate a current lock/unlock status of the particular RDSD and docking port. In one embodiment the signaling includes illuminating a light emitting diode (LED) to a first color associated with an unlock status. The LED provides a different illumination status while the docking port is locked with a RDSD coupled thereto.

According to one aspect, the method includes receiving a first access code at a first access panel that controls an opening and closing of a door panel covering the storage compartment. The method also includes comparing the first access code to at least one unlock code for the first access panel of the storage compartment, and in response to the first access code matching at least one unlock code, enabling opening of the first access panel and access to the storage compartment beneath the first access panel.

In one embodiment, the method includes detecting insertion of a RDSD into a docking port, and, in response to detecting insertion of the RDSD, initiating a security protocol to confirm the RDSD does not have corrupted data or malware, the security protocol including running a virus scan on the RDSD prior to enabling a transfer of the data to the on-board high capacity storage. The method also includes coordinating a transfer of data from the RDSD to an on-board high capacity storage. The method further includes triggering at least one of the IT equipment to initiate processing of data retrieved from the RDSD. Accordingly, the data is automatically processed within the mobile data storage exchange system while the MDC is operating in the field.

In one embodiment, the method also includes detecting a connection of the on-board high capacity storage with a facility management IHS, confirming that the detected facility management IHS is a verified data aggregation/download device, and enabling the facility management IHS access to retrieve, copy, and/or manipulate the data stored on the on-board high capacity storage.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6 is a block diagram representation of functional components of a management IHS of a VC MDC configured with a mobile data storage subsystem, according to one or more embodiments;

DETAILED DESCRIPTION

Figure 1A:
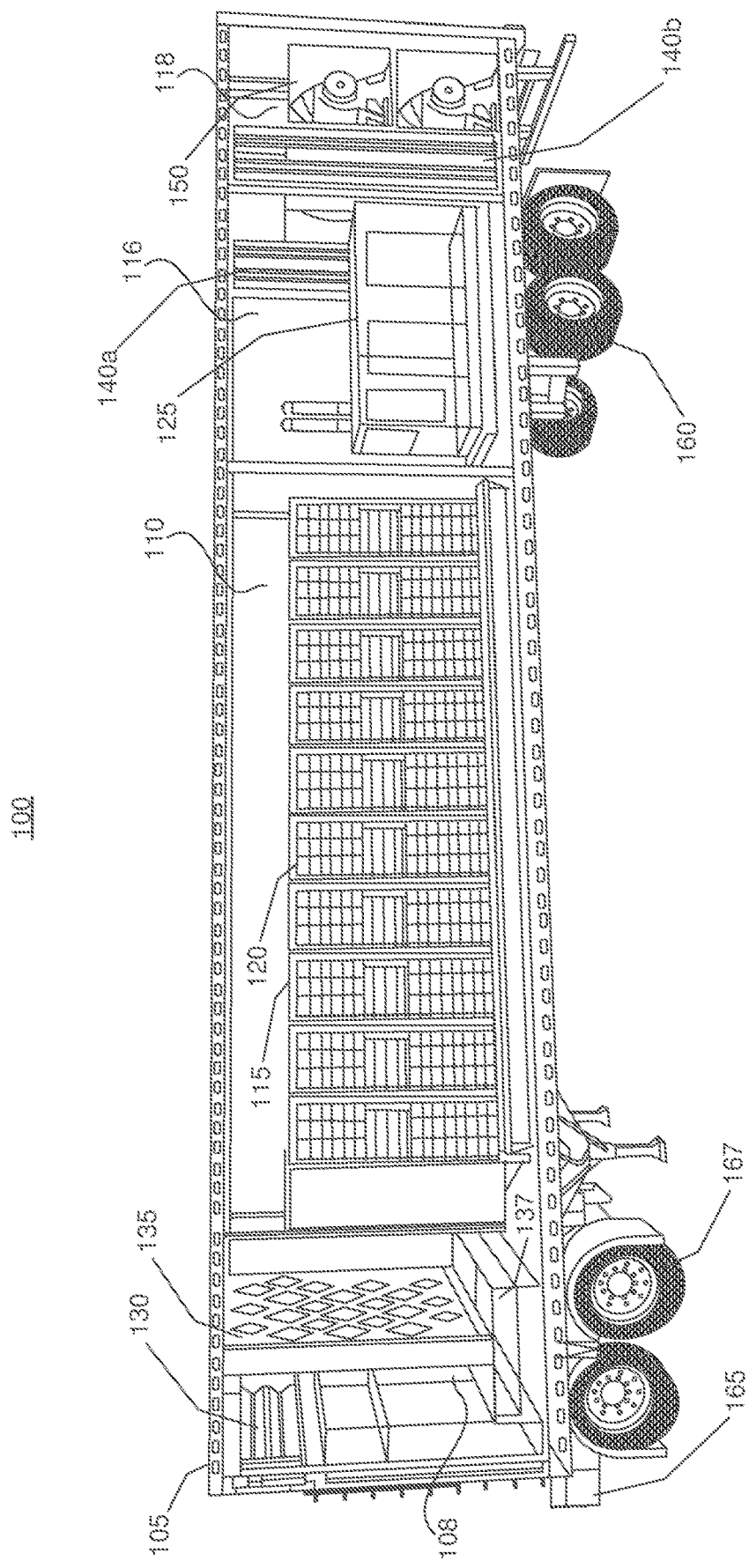
FIGS. 1A-1D presents block diagram illustrations of different views of an example velocity cooled (VC) mobile data center (MDC) configured to provide velocity-generated ram air-cooling that enables data processing by the MDC during data collection and transportation in the field, according to one or more embodiments.

The illustrative embodiments provide a mobile data center (MDC), a system, and a method that enable large-scale data collection and information handling system (IHS) computation of collected data that is supported by velocity-generated ram air cooling during transportation of the MDC. A mobile data storage system includes a volumetric container of a mobile data center having IT equipment operating therein and an on-board high capacity storage (HCS). A storage compartment is configured within the container and is accessible from an exterior of the container. The storage compartment includes a plurality of individual storage slots each providing a docking port for connecting a removable data storage device (RDSD). At least one RDSD is inserted into a first storage slot of the plurality of storage slots. The RDSD facilitates rapid transfer of data to the MDC from edge data acquisition systems and to a data center facility. A management information handling system (IHS) is communicatively coupled to the HCS and to each docking port. The management IHS is configured to detect insertion of an RDSD into a docking port and coordinate a transfer of data from the RDSD to the HCS.

As utilized herein, the term "ram air" generally refers to air that is pushed at a high velocity into an opening of a wall of an MDC as a result of movement of the MDC. According to a first aspect, a velocity cooled (VC) MDC (hereinafter VC MDC) is configured to provide velocity-generated air-cooling for the information technology (IT) equipment operating within the VC MDC to complete data collection and data processing operations. A plurality of functional features of the VC MDC are presented herein, with reference to the various figures. Major sections of the description are presented with a heading. However, it is appreciated that the headings are provided only to highlight specific aspects of the broader disclosure, without limitation or exclusivity with regards to the other aspects of the disclosure.

According to one embodiment, the VC MDC is an iso-container or a grouping of modular sub-assembly containers placed on a wheeled transport (trailer). The container is a volumetric enclosure having exterior walls and a ceiling and floor. The container is supported by physical affordances for facilitating movement of the container/trailer along a travel path. The trailer also includes connection affordances for connecting to an engine/motor that enables the lateral movement of the container via at least one of a pull, push, levitation, or other force applied to/against the container/trailer. During movement of the container by one or more moving forces, exterior air is forced/pulled into air intake dampers and circulated through the interior of the container, passing over the IT equipment to remove heat being generated by the equipment and out the exhaust dampers. This use of convection air flow to cool the IT equipment allows for the VC MDC to provide cooling without the use of the air handling units (AHUs) while the container is moving (or being moved) at a sufficient velocity to provide enough cooling airflow through the container.

According to one embodiment, the container/trailer has a physical enclosure comprising exterior walls, with at least a front sectional wall, lateral side walls, and a rear wall, a floor, and a ceiling. At least a first section of the enclosure and a corresponding section of the floor are configured to house at least a first IT rack comprising a plurality of IT equipment, such as information handling systems. The racks are securely affixed to the floor using one or more latches and connecting affordances to prevent movement of the rack after securing the rack to the floor. The racks include vibration dampers that soften the effects of vibrations on the IT equipment located/housed on the rack while the container is in motion. A second section of the enclosure at an exterior wall is configured with a secure access panel behind which is a storage rack that supports insertion and removal of a plurality of storage modules. In some embodiments, a third section of the enclosure can include at least one air handling unit (AHU) that operationally pulls air from a front section of the container to a rear section of the container, causing the movement of air over the IT equipment in order to convectionally remove heat generated during operation of the IT equipment.

The front wall of the container is located at a front relative to a directional movement of the container. The front wall includes at least one damper that can be placed into one or more positions ranging from a fully closed position to a fully open position to control an amount of exterior air that enters the container while the container is being moved in the aft-facing direction of the container. At least one of a rear and a lateral wall of the container includes exhaust dampers that open to release exhaust air generated by the passing of the intake air over the IT equipment to convectionally absorb and remove the heat. The configuration of the container with the intake and outflow dampers enable the use of airflow derived from vehicle velocity to pressurize the airflow ingest plenum of operational IT devices during transport of the container. According to one embodiment, a controller is programmed with a control algorithm for dynamically modulating airflow ingest and egress dampers and auxiliary AHUs to maintain a differential pressure set-point at the IT equipment inlet point that is used for cooling.

The container also includes a large air filter/evaporative medium positioned in the path of incoming air between the intake dampers and the IT equipment. The air filter/evaporative medium removes particulates and/or contaminants from the air before the filtered air impacts the exposed surfaces of the IT equipment. The air filter/evaporative medium also cools the ram air being ingested at the In one embodiment, a chemical sensor is positioned on the exterior of the intake dampers and monitors for the presence of damaging chemicals in the exterior air. The chemical sensor is coupled to a controller, which is in turn coupled to an automated gear that closes and opens the intake damper.

In one embodiment, the VC MDC includes at least one mounted seismic rack including operational vibration damping and a direct evaporative (DE) cooling subsystem to provide DE cooling of the IT equipment. The DE cooling subsystem includes a water reservoir/tank, an electric pump, and an evaporative fluid within a network of conduits for direct evaporative cooling of the IT equipment. The VC MDC further includes an on-board power supply system, including a generator electrically coupled to a power distribution unit (PDU) for providing onboard power to IT equipment during transport of the IT equipment. To allow for receipt and transfer of data in the field, the VC MDC includes a removable high density storage system for rapid transfer of data from/to the MDC to/from the edge data acquisition systems and/or to/from the centralized data center (hub).

According to one embodiment, the VC MDC also includes high-bandwidth uplink system (HBUS) for data ingestion. The HBUS is located on an exterior-surface of the container.

In one embodiment, the VC MDC is equipped with a vehicle telemetry interface for providing operational/environmental feedback from the VC MDC to the driver of the transport vehicle. Real time data provided to the driver's receiving device, or dashboard display, can include generator status, generator fuel level, evaporative cooling liquid levels, ambient temperature of the interior of the IT equipment surroundings, etc.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Further, those of ordinary skill in the art will appreciate that the hardware components and basic configuration depicted in the various figures (e.g. FIG. 6) and described herein may vary. For example, the illustrative components within IHS 600 (FIG. 6) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

Figure 1B:
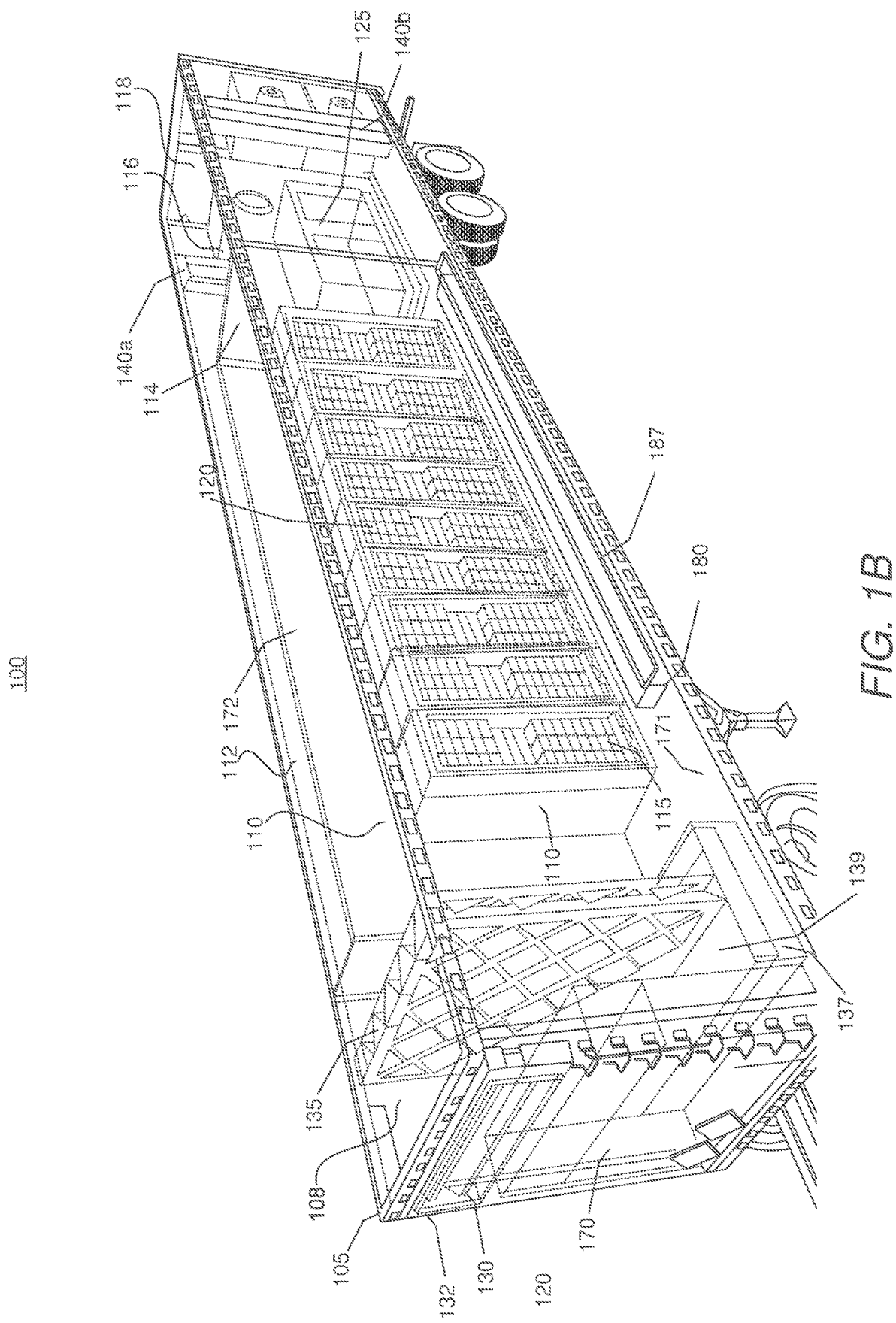
Figure 1C:
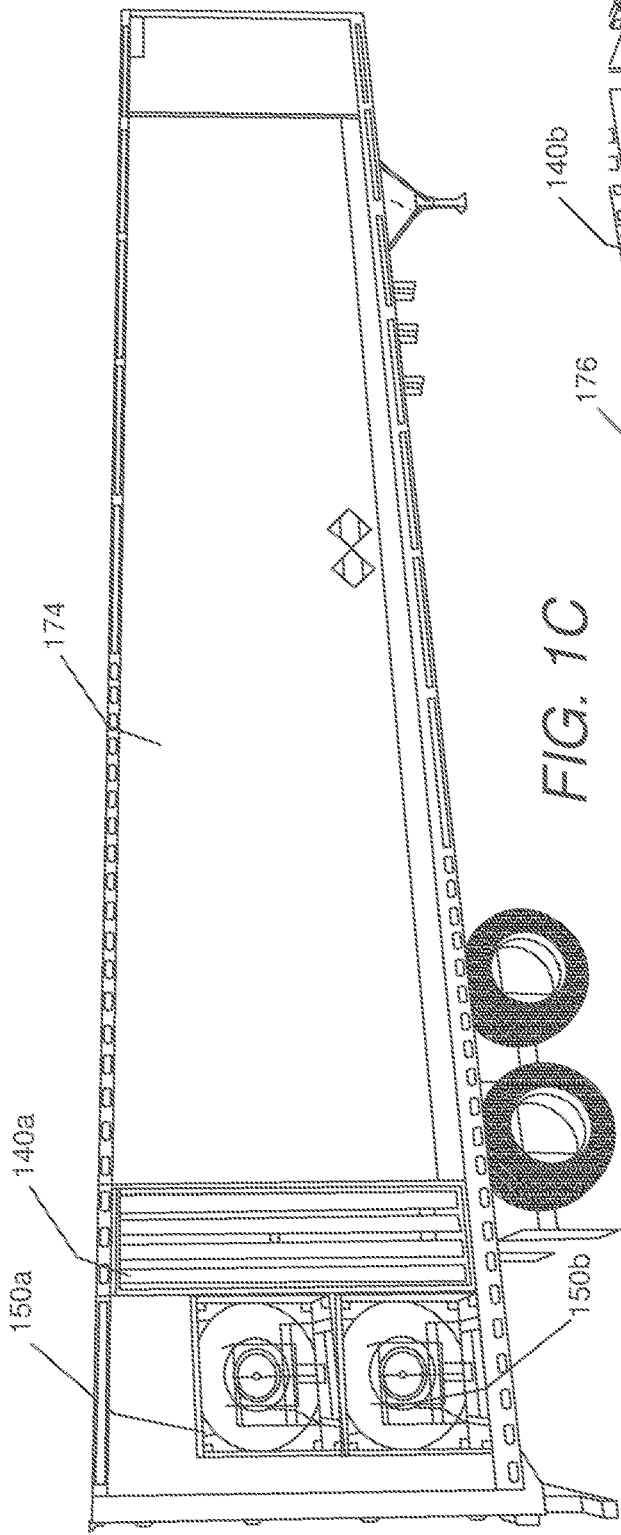
Figure 1D:
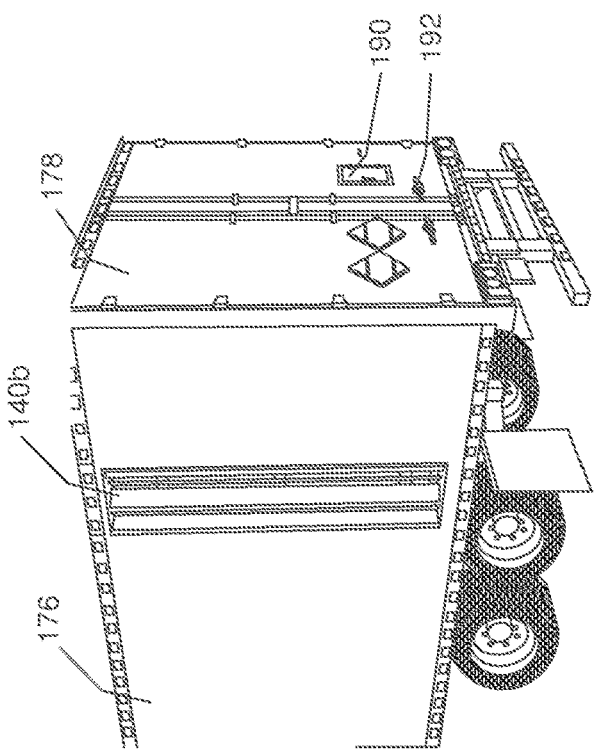

With reference now to the figures, beginning with FIGS. 1A-1D and FIG. 2, there are provided block diagram illustrations of different views of an example mobile data center (MDC) configured to provide velocity-generated air-cooling to enable data processing by the MDC during data collection and transportation, according to one or more embodiments. As introduced above, the presented configuration of the velocity cooled (VC) MDC is referred to herein as VC MDC 100. The description of the different views presented by FIGS. 1A-1D and FIG. 2 are presented together, with overlapping reference across the various figures. FIG. 1A specifically illustrates a cut away side view of VC MDC 100 with a right, side panel removed, exposing the interior configuration and contents of VC MDC 100. FIG. 1B illustrates a partial side-view and front view of VC MDC 100. FIG. 1C illustrates a side view of the left side panel of VC MDC 100 with exposed air movers 150*a*, 150*b* of an air handling unit (AHU) 350 (FIG. 3) and side exhaust/egress air dampers 140*a*. FIG. 1D illustrates a rear view of VC MDC 100 with a back panel configured as dual doors with latching mechanism 192 and a security access panel 190. FIG. 2 illustrates a mobilized VC MDC 200 attached to transportation vehicle 205.

VC MDC 100 includes a volumetric enclosure 105 having a plurality of exterior walls, with first aft-facing wall/panel 170, floor 171, ceiling 172, at least one side wall/panel 174, 176, and rear panel(s) 178. Storage compartment 180 is built into one of side panels 174 and includes hinged storage compartment cover 187. The functionality associated with storage compartment 180 will be described in greater details below. The interior space of the enclosure 105 is divided up into different sections/compartments, including air intake (i.e., ram air and vehicle exhaust air ingesting (and telemetry)) compartment 108, information technology (IT) compartment 110 with structural wall/panel separator 114, cabling and exhaust air flow compartment 112, power and master controller compartment 116, and air handling unit (AHU) compartment 118.

As illustrated within FIG. 1B, at least a first section of the enclosure and a corresponding section of the floor are configured as IT compartment 110, which houses at least IT rack 115 having a plurality of IT equipment 120 thereon. Each IT rack 115 is securely affixed to floor 171 using one or more latches and connecting affordances to prevent lateral or tilting movement of IT rack 115 relative to floor 171 after IT rack 115 is secured to floor 171. Additionally, in at least one embodiment, IT rack 115 is configured or secured with at least one mounted seismic rack affordance that provides vibration damping for operational and/or movement-induced vibration. FIG. 1B also illustrates storage compartment 180 and cover panel 187 located on the open side of VC MDC 100. Cover panel 187 opens to the exterior of VC MDC 100 enabling access to the inside of storage compartment 180.

Power and master controller compartment 116 houses on-board power supply system 125, including a generator (125) electrically coupled to one or more PDUs (125) for onboard power delivery to IT equipment. AHU compartment 118 includes two air movers 150*a* and 150*b*. In one embodiment, AHU compartment 118 can be configured with/as a direct evaporative (DE) cooling subsystem that can provide DE cooling of IT equipment 120. The DE subsystem can include a water reservoir/tank, an electric pump, and an evaporative fluid within a network of conduits for direct evaporative cooling of IT equipment 120.

Figure 2A:
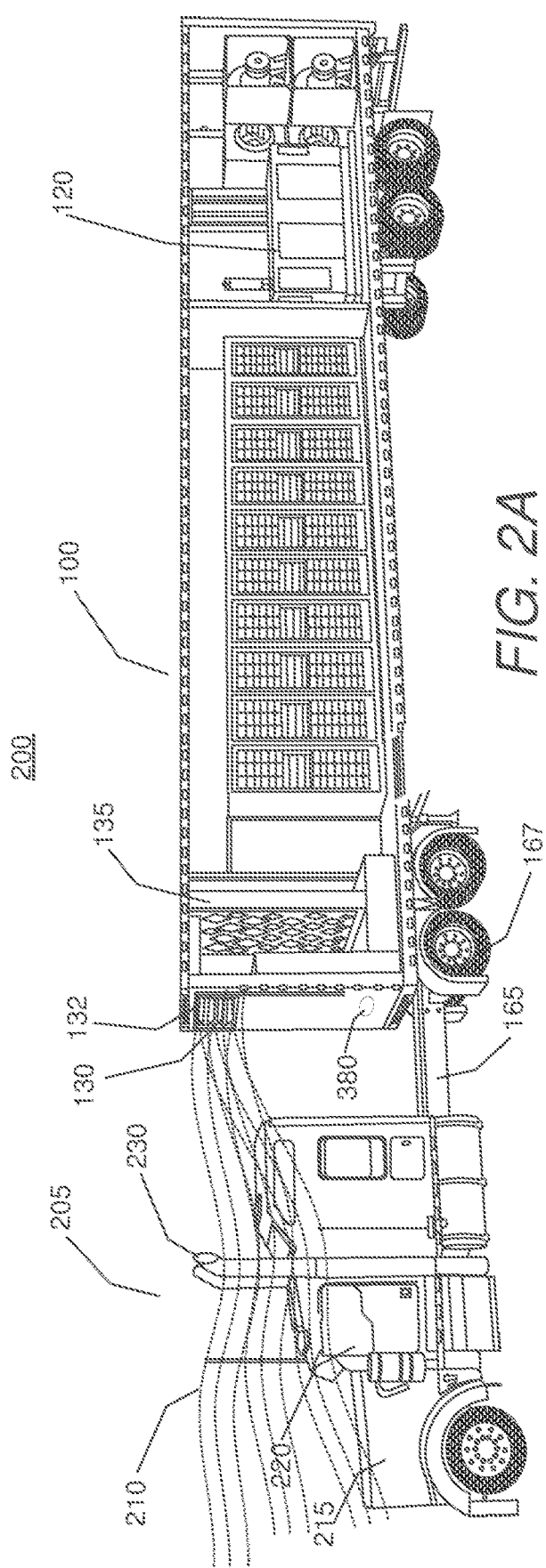
FIG. 2A is an isometric view of the VC MDC hitched to a moving vehicle that enables ingestion of outside air to provide cooling to internal information technology (IT) equipment, according to one embodiment.
Figure 2B:
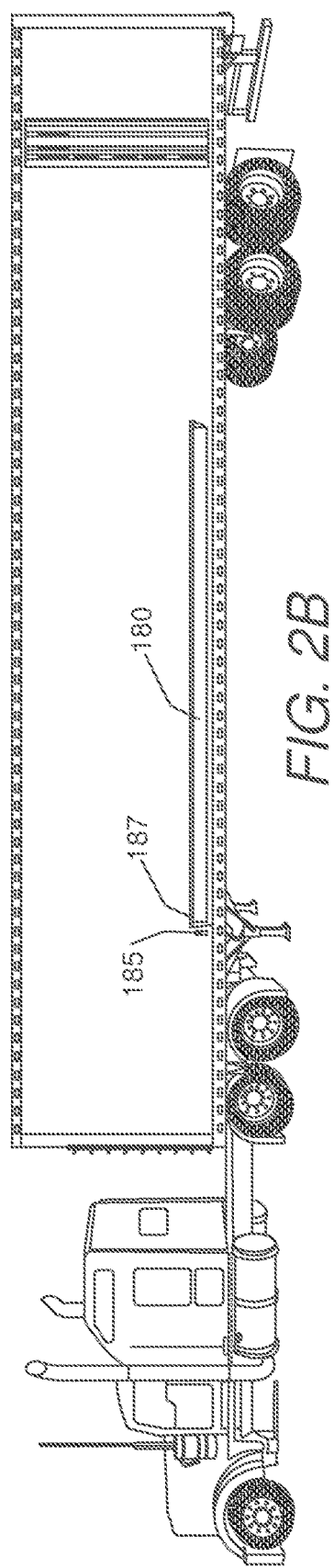
FIG. 2B is another isometric view of VC MDC hitched to the moving transport vehicle, illustrating the location of an externally accessible storage compartment, according to one embodiment.

Referring now to FIGS. 2A and 2B, which provide an isometric view of VC MDC 100 hitched to a moving vehicle (205) that enables ingestion of outside air 210 to provide cooling to internal IT equipment 120, according to one embodiment. FIG. 2B further illustrates the location of storage compartment 180 with access/cover panel 187, according to one embodiment. Additional features related to storage compartment 180 are presented hereafter.

In the illustration of the figures, mobile VC MDC 200 is presented as an 18-wheeler trailer-tractor vehicle. Also, VC MDC 100 is illustrated as one of an iso-container placed on a wheeled trailer for transportation. It is appreciated that VC MDC 100 can also be a grouping of modular sub-assembly containers, in another embodiment. VC MDC enclosure 105 is designed as a container/trailer equipped with wheels 160 and/or other affordances that enable VC MDC 100 to be moved in the forward/aft direction at a velocity that enables cooling air flow through IT compartment 110.

As presented in the descriptions herein, the direction of flow of air is in the opposite direction of the forward motion of VC MDC 100 (when VC MDC 100 is being moved). IT compartment 110 comprises at least one and potentially a plurality of heat generating IT equipment 120. In the illustrated embodiment, the at least one IT equipment 120 is provided in IT rack 115 that is securely affixed to floor 171 of IT compartment 110 via one or more fasteners or attachment affordances (not shown). Each of the one or more IT racks 115 is secured in a manner to avoid tipping or tilting and/or excessive vibration of IT equipment 120 during movement of the VC MDC 100.

In one embodiment, VC MDC 100 is configured for placement on a transportation trailer, such as a flatbed or a wheeled frame (not specifically shown) that is attached to a transportation vehicle (205). In one implementation, the transportation trailer may be a wheeled frame of a train, and VC MDC 100 is then one of the cars of the train. Referring specifically to FIG. 2, transportation vehicle 205 is presented as a truck having a cab 220 and an extended back portion or hitch 165 balanced on rear wheels 167. Hitch 165 is attached to VC MDC 100 and/or the trailer on which VC MDC 100 is attached. As shown, the extended back portion, hitch 165 of transportation vehicle 205 extends below a front section of VC MDC 100 to provide lift and attachment to VC MDC 100. Transportation vehicle 205 includes a cab 220 and a combustion engine 215 that powers the vehicle to enable forward motion. Combustion engine 215 consumes fuel and generates exhaust air which can be outputted via one or more exhaust pipes 230 extending above cab 220. Within cab 220 is a driver area that includes a seat and vehicle control affordances (e.g., steering wheel, gears shifter, fuel (gasoline or diesel) pedal, brake pedal, etc.). In one embodiment, cab 220 also includes a dashboard that includes at least one display that provides feedback about vehicle operation and motion, such as velocity. The displays can include telemetry displays, providing real-time data associated with the ambient conditions in VC MDC 100. While shown as an 18-wheeler tractor-trailer assembly comprising a truck attached to the front of VC MDC 100 that provides a pulling force to move VC MDC 100 forward, it is appreciated that other types of transportation vehicles and/or mechanisms can be utilized. The particular type of transportation vehicle can provide one of a push, pull, or levitation force that causes the forward movement of VC MDC 100. It is appreciated, that the rate of movement and/or the velocity of VC MDC 100 is directly related to the amount of push/pull force provided on the VC MDC 100 by the transportation vehicle. Additionally, while the described embodiments provide for forward movement of VC MDC 100, alternate embodiments can be provided in which the VC MDC is configured to be moved in the opposite/backward direction and or in a side/lateral direction, relative to the location of IT compartment 110 and/or IT equipment 120 within VC MDC 100. In these alternate embodiments, the location of air intake dampers and exhaust dampers would be adjusted to allow for velocity-induced air flow through IT compartment 110 while VC MDC 100 moves.

RAM Air Cooling System for VC MDC

Figure 3A:
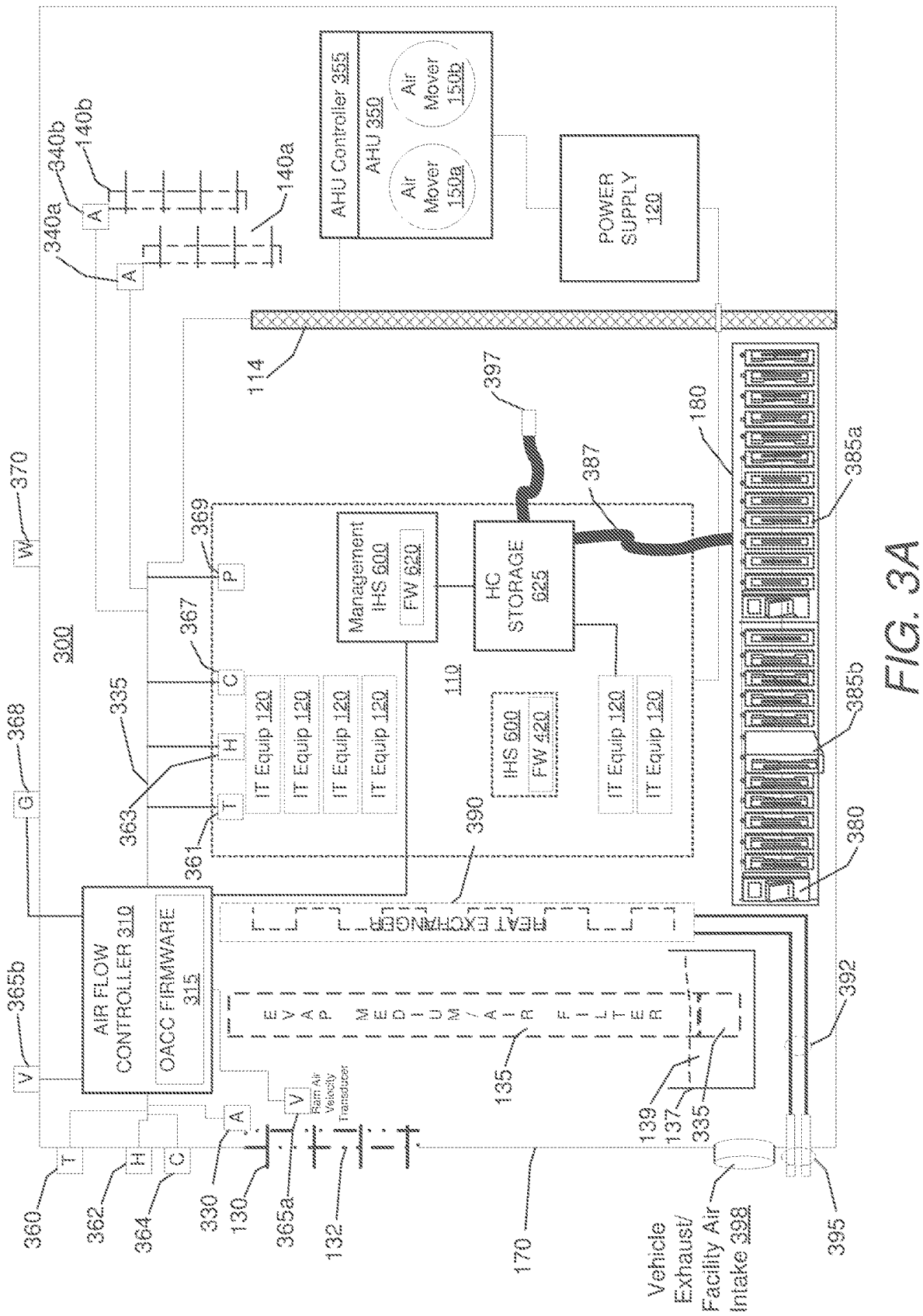
FIG. 3A is a block diagram representation of component parts of a cooling subsystem that includes an air handling unit (AHU) and which enables and/or supports internal temperature control functions of the VC MDC, in accordance with one or more embodiments.
Figure 3B:
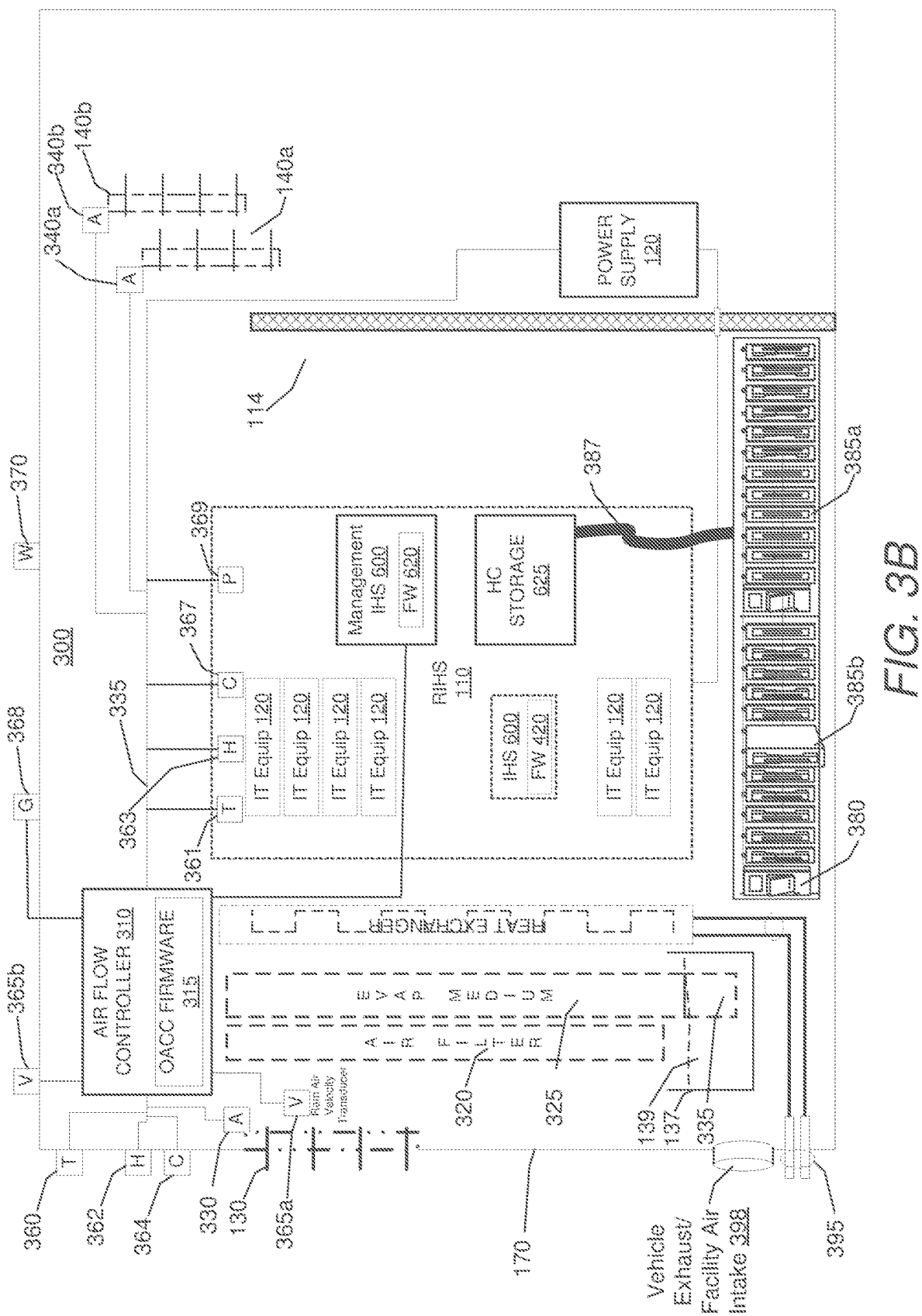
FIG. 3B is a block diagram representation of component parts of a ram air cooling subsystem that enables and/or supports internal temperature control functions of the VC MDC, without an AHU, in accordance with one or more embodiments.
Figure 4:
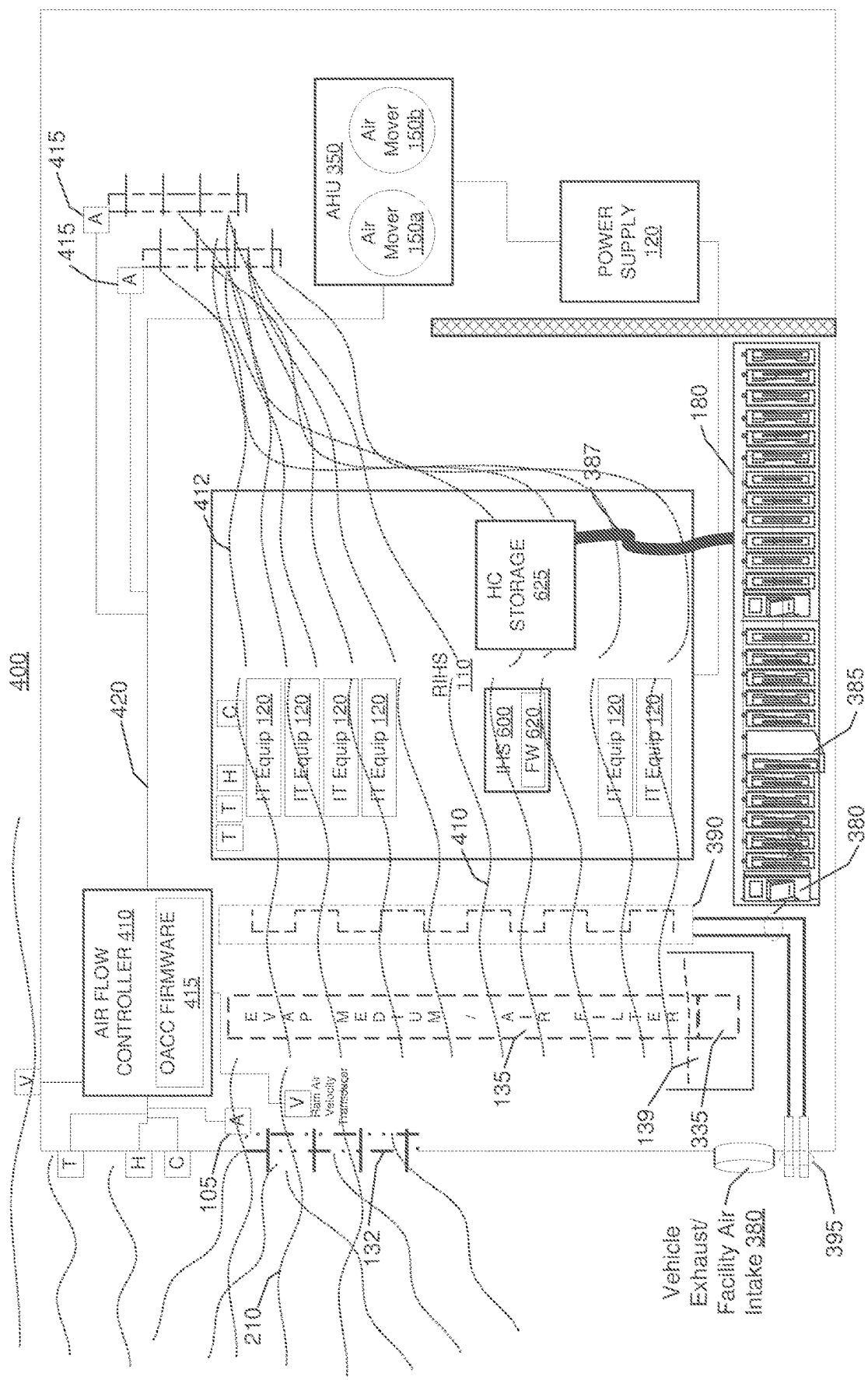
FIG. 4 is a block diagram illustrating the flow of outside air through the VC MDC utilizing selectively controlled ingest and egress dampers, in accordance with one embodiment.
Figure 5:
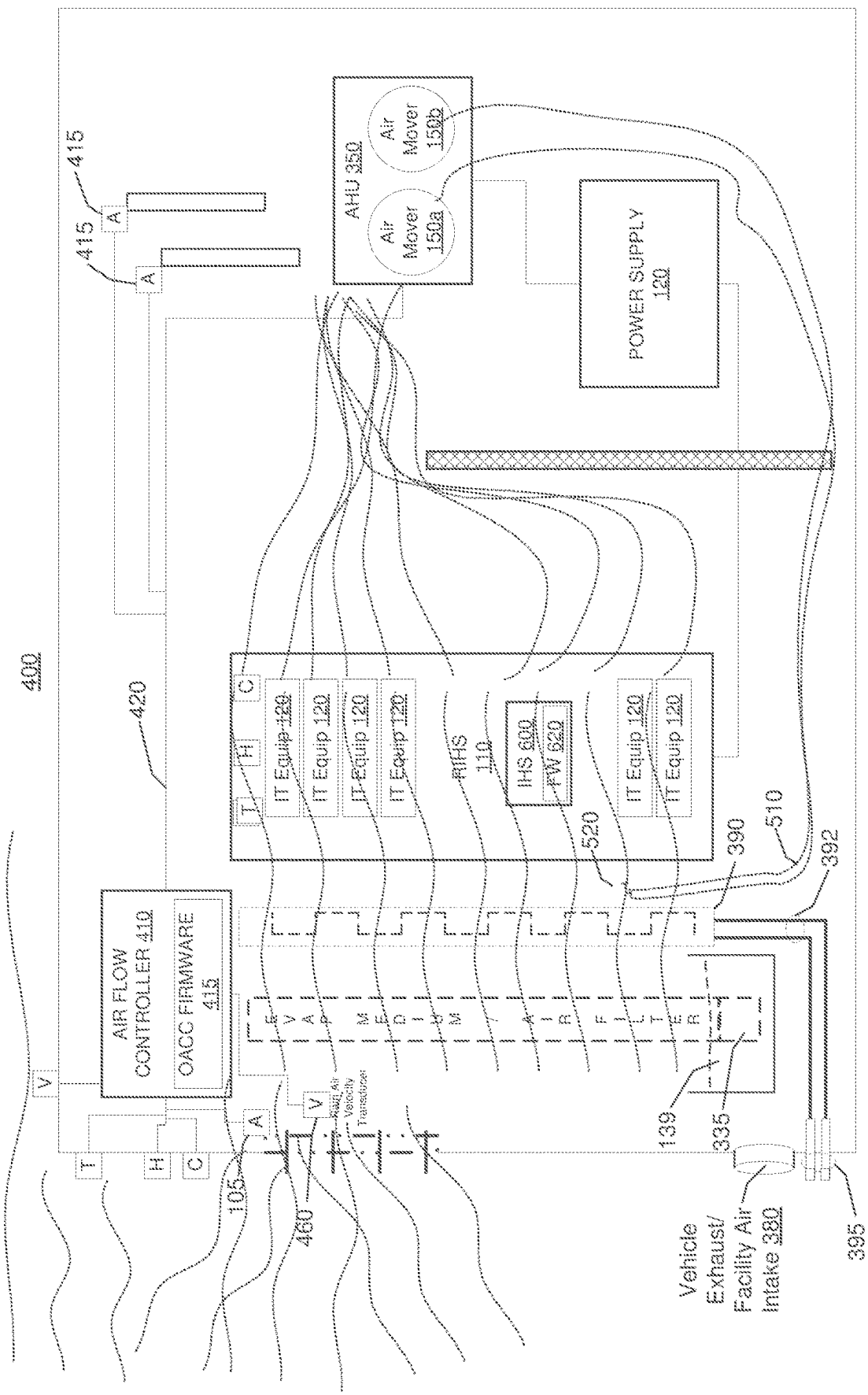
FIG. 5 is a block diagram illustrating a recirculated flow of outside air through the VC MDC utilizing selectively controlled ingest and egress dampers and an air handling unit (AHU), in accordance with one embodiment.

Referring now to FIGS. 3A-3B, 4, and 5 with continuing reference to FIGS. 1A-1D and FIG. 2. FIGS. 3A and 3B are block diagram representations of component parts of a cooling subsystem that enable and/or support VC cooling and/or internal temperature control functions of VC MDC 100, in accordance with one or more embodiments. The cooling subsystem of FIG. 3A includes AHU 350 as a secondary cooling source, while the cooling subsystem of FIG. 3B does not. FIG. 4 is a block diagram representation of the movement of outside cooling air within cooling system of VC MDC 100, with the airflow being selectively controlled utilizing ingest and egress dampers, according to one or more embodiments. FIG. 5 is a block diagram representation of the movement of cooling/heating air within VC MDC 100 with a recirculation path introduced utilizing AHU 350, in accordance with one embodiment;

As provided by FIG. 3A, VC MDC 100 includes ram air velocity-controlled cooling subsystem (VCCS) 300 that provides cooling to the at least one IT equipment 120 within IT compartment 110. Operation of the various processes provided by the VCCS 300 is controlled by air flow controller 310, which is configured with outside air cooling control (OACC) firmware 315. OACC firmware 315 includes a plurality of set points, data, and cooling algorithms that enable air flow controller 310 to perform the various cooling functions based on the velocity of travel and the amount, characteristics, and quality of ingested outside air, as described herein. Additionally, as illustrated within FIG. 3, VCCS 300 includes and/or is communicatively connected to management information handling system (IHS) 600. While shown as a separate component from air flow controller 310, it is appreciated that air flow controller 310 can be an extension of, or a module executed within, management IHS 600. The component make-up and functionality provided by management IHS 600 will be described below.

VCCS 300 includes an air inlet/ingress/intake opening 132 with outside air intake damper 130 configured within the aft-facing wall 170 of the enclosure/container (105). In one embodiment, outside air intake damper 130 is configured with an actuator 131, which enables intake damper 130 to be selectively moved/positioned in one of a plurality of external air intake positions, ranging between a fully-opened position and a fully-closed position. Actuator 330 is communicatively coupled to air flow controller 310. The actuator-provided open/close setting of the intake damper, while the container/trailer is being moved in the aft-facing direction, determines the amount of exterior air that enters enclosure (105) at the ingress opening 132. The forward velocity of the container/trailer creates an inflow of outside air. The rate the inflow of outside air enters the trailer is, in part, controlled by and/or correlated to the velocity of the container/trailer movement and/or the velocity at which the transportation vehicle is moving.

VCCS 300 also includes air flow controller 310 communicatively coupled to the motor of the motorized front damper 130 and to velocity sensor 365a, 365b that detects the velocity of at least one of: (a) a directional flow of ambient air moving from the outside into the interior of the enclosure (105) to impact and provide cooling for the heat-generating IT equipment 120; and (b) a movement of the transportation trailer on which the enclosure (105) is affixed for transportation. Air flow controller 310 provides operational control of the cooling air intake damper 130 to place damper 130 in a specific open position based on the detected velocity, thereby controlling an amount of cooling air allowed to enter into the enclosure (105). Consequently, VC MDC 100 is able to maintain the IT equipment within a desired operational range of temperatures.

As one aspect of the disclosure, characteristics associated with the outside air are required to be sensed and communicated to airflow controller 310. These sensed characteristics of the air enable airflow controller 310 to perform calculations to determine an amount of outside air to ingest into VC MDC 100 and the amount of exhaust air to expel from VC MDC 100. As shown, VCCS 300 includes temperature sensors 360, humidity sensors 362, chemical sensors 364, velocity sensors 365a, 365b, each of which are communicatively coupled to airflow controller 310. These sensors detect a respective one of the outside air temperature, the outside air humidity, chemical composition of the air, the velocity of the outside air or relative velocity based on the detection of the movement of the container.

Additionally, VCCS 300 also includes internal sensors, of which second temperature sensor 361, second humidity sensor 363, second chemical sensor 367, and pressure sensor 369 are illustrated. Internal sensors provide ambient conditions of the air inside of IT compartment 110, which is utilized by airflow controller 310 and/or management IHS 600 to modulate and/or adjust one or more characteristics related to the outside air being ingested into the container. Internal temperature sensor 361 provides the actual ambient temperature of the IT equipment. Airflow controller 310 compares the actual ambient temperature to a range of temperature values between highest operating temperature threshold and lowest operating temperature threshold to ensure IT equipment 120 is operating in an ideal range of temperature. External chemical sensor 364 identifies when the chemical composition of the ingested air is not conducive (or potentially harmful) to the IT equipment 120. Air flow controller 310 responds to sensing/detecting these conditions by: (i) closing the intake dampers; and (ii) signaling the management IHS 600 to throttle the IT equipment; and/or (iii) resorting to secondary cooling, such as using AHU and/or DE cooling, if available. Pressure sensor 369 provides an internal pressure reading that air flow controller 310 utilizes to control the open/close position/setting of ingress damper 130 and egress dampers 140a, 140b to ensure the internal pressure is maintained below a pressure threshold value.

Air flow controller 310 is communicatively coupled to GPS receiver 368 and/or to wireless transceiver 370, which allow air flow controller 310 to track the location of VC MDC 100. GPS receiver 368 and/or wireless transceiver 370 provide location based information that can correlate to road conditions that affect the velocity of travel of VC MDC 100. These conditions can include, but are not limited to time of day of travel, presence of stop lights, posted speed limits on particular roadways, and occurrence of accidents causing traffic delays or congestion, etc. Air flow controller 310 utilizes information about the traffic and road conditions and associated mapping of the roadways and geographical areas to plan for changes in velocity that can affect availability of outside air cooling for IT equipment 120 operation. In one embodiment, the various sensors can be implemented as one or more transducers, which provides a specific level of electrical signal to airflow controller 310, which signal level correlates to a specific value of the measured component of the outside air. In one embodiment, OACC firmware 315 includes several data sets that enable airflow controller to accurately determine the temperature, humidity, and velocity, of the outside air.

In the illustrated embodiment, two different velocity values are sensed/recorded by respective velocity sensors 365a, 365b, which can be velocity-sensing transducers, and are therefore also referred to herein as velocity transducers 365a, 365b. According to one aspect of the disclosure, the actual velocity of the air entering the chamber of VC MDC 100 as measured by velocity transducer 365a, will be different from the outside air velocity measured by second velocity transducer 365b due, in part, to the presence of ram air effects. According to one embodiment, the small aperture provided by air intake opening 132 (FIG. 1A, 2B) presents an air intake design that utilizes dynamic air pressure created by the vehicle motion to increase the static air pressure inside of VC MDC 100. With this "ram air" cooling, the velocity of the air (i.e., the flow rate) being ingested is increased due to the small sized opening 132 which the larger mass of exterior air is made to pass through when the intake dampers 130 are open. Thus, the amount of cooling air available and the velocity of that air may be magnitudes greater, respectively, than the amount of air that would normally impinge on the area of air intake opening 132 and the velocity of the transport vehicle and/or outside air, as measured by the exterior velocity sensor 365b. As a result, cooling of IT equipment can be achieved without secondary sources of cooling while the vehicle is moving at a relatively low velocity, e.g., 30 mph.

In the illustrative embodiments of FIGS. 1A, 1B, 2A, and 3A, VCCS 300 also includes a combination evaporative medium and air filter (evap. medium/air filter 135) that is positioned in an ingress path of incoming air 210 between the intake damper 130 and the IT compartment 110 with at least one IT equipment 120. Air filter component of evap. medium/air filter 135 removes particulates and/or contaminants from the air 210 before a resulting filtered air comes into contact with exposed surfaces of the at least one IT equipment 120. While shown as a single large air filter, it is appreciated that the filtering of the outside air can be completed by different sizes and configurations of air filters, without limitation. In one embodiment, air filter 135 can include a chemical filter to remove harmful chemicals from the air before the year is allowed to be passed into IT compartment 110. The integrated evaporative medium of evap medium/air filter 135 has a first (bottom) end 335 extended into sump container 137 that is filled with a cooling liquid 139, such as water.

FIG. 3B presents an alternate embodiment in which VCCS includes a separate air filter 320 and evaporative medium 325, both positioned in an ingress path of the incoming flow of cooling air between the air intake opening and the at least one IT equipment. As with the above combination implementation, air filter 320 removes particulates and contaminants from the cooling air before a resulting filtered, ingress air is passed through evaporative medium 325. Evaporative medium 325 includes a wicker-like material that absorbs liquid and has one end extended 335 into sump container 137 which includes cooling liquid 139, such as water. The cooling liquid is absorbed by the wicker material and permeates the evaporative medium 325. The liquid-permeated/absorbed evaporative medium 325 provides cooling to the ingested ram air as the air passes through the liquid-absorbed evaporative medium.

FIGS. 3A and 3B also present a liquid-to-air (LTA) heat exchanger (HE) subsystem, which includes LTA HE 390 coupled via intake and outflow conduits 392 to external connectors 395. The application of LTA HE subsystem to provide cooling or heating of the ingested air will be described later within the descriptions of FIGS. 7 and 15.

Finally, FIGS. 3A-3B introduce an interior view of storage compartment 180 (FIG. 1), with security access pads 380 and a plurality of removable data storage devices (RDSDs) 385. As shown, a first RDSD 385b is in a partially inserted or partially removed state, while the remaining RDSDs 385a are inserted into respective slots of storage compartment 180. Within the description, the collective group of RDSDs are referenced generally as RDSDs 385, with the first RDSD shown in a partially removed/inserted position being referenced as RDSD 385b, the inserted RDSDs being referenced as RDSD 385a, and a second RDSD being carried to the storage compartment 180 (as provided in FIG. 10) references as RDSD 385c. Inserted RDSDs 385a are communicatively coupled via high bandwidth data bus 387 to high capacity storage 625. The functionality and use of storage compartment 180 and other components illustrated therein are described in greater detail in the description of FIGS. 6-10.

As shown by FIGS. 4 and 5, outside air 210 enters through front opening 132 of the enclosure (105) at a first velocity V1, as measured by exterior velocity sensor 365b. Airflow controller 310 receives data related to characteristics of outside air 210 from each of the plurality of sensors (360-365). It is appreciated that these sensors can be implemented as transducers that provide an electrical signal relative to the measured telemetry values, respectively. Outside air 210 passes through evap medium/air filter 135 to provide filtered, cooled air 410, which flows through IT compartment 110 (at a cold aisle side of IT equipment), contacting and convectionally removing heat from IT equipment 120. Heated air, hereinafter referred to as IT exhaust air or simply exhaust air 412, exits from IT equipment 120 (at the hot aisle side of IT equipment). The terms cold aisle and hot aisle are known to those skilled in the art of modular data centers. According to one embodiment, and as illustrated in FIGS. 4 and 5, IT exhaust air 412 travels/or is routed along a particular path away from IT compartment 110 towards the rear of the container. Partition wall 114 represents the division/separation between IT compartment 110 and a back portion of the container. To provide additional cooling to ingress air, evap. medium/air filter 135 has a first end extended into sump container 137, which includes a cooling liquid 139, such as water.

VCCS 300 also includes exhaust/egress air control damper 140a, 140b positioned within at least one of the side facing walls 174, 176 and the rear facing wall or rear panel 178. It is appreciated that exhaust air damper can be located in ceiling 172 or other location that is downstream of IT compartment 110. Exhaust air control damper 140a, 140b opens to release exhaust air, which is the outside air ingested into IT compartment 110 and heated while passing over/through the heat generating IT equipment 120. According to one embodiment, the intake air convectionally absorbs and removes heat being dissipated by the IT equipment, and the heated exhaust air can then be made to egress/exit the container via the egress damper(s) 140a, 140b. As described later, in some situations as illustrated by FIG. 5, some or all of IT exhaust air 510 is recirculated within the IT compartment 110, based on specific conditions detected by VCCS 300 within at least one of the outside air and IT compartment 110. Recirculated IT exhaust air 510 is channeled back to cold aisle 520 of IT compartment 110, and is reused as cooling air flow to cool and/or heat IT equipment 120. Similar to intake damper 130, in one or more embodiments, each exhaust air egress damper 140a, 140b is configured with actuator 340a, 340b, which enables egress damper 140a, 140b to be selectively moved/positioned in one of a plurality of exhaust air expelling positions, ranging between a fully-opened position and a fully-closed position. Airflow controller 310 is thus able to control both the rate at which outside air is allowed to be ingested into VC MDC 100, and how much of the ingested air that becomes exhaust air should be expelled from VC MDC 100 to effectuate the right balance of airflow, pressure, humidity, and temperature conditions within IT compartment 110.

According to one embodiment, to support operations of IT equipment 120 during periods of low velocity movement or when the transport vehicle is not moving, VCCS 300 further includes at least one AHU 350 having an AHU controller 355. AHU 350 includes at least one air movers 150a, 150b, such as a motorized electrical fan. When a signal is received from airflow controller 310, AHU controller 355 sets AHU 350 to provide a specific amount of rotational velocity for the air movers to generate an appropriate flow of cooling air within IT compartment 110. At least one embodiment, AHU controller 355 is triggered to provide cooling air IT equipment to supplement and/or replace the reduced flow of outside air into VC MDC 100. Additionally, as described in greater detail below, VCCS controller 310 communicates with management IHS 600, which controls the processing and power functions of IT equipment. The various components within VC MDC 100 receive electrical power from onboard power supply 125, also referred to as power supply system (which is inclusive of PDU). The amount of power available from power supply system 125 to supply all of the components within VC MDC 100 is capped at a predetermined amount of power. As such, the availability of power for IT equipment 120 processing is reduced whenever AHU 350 is required to provide cooling, because AHU 350 is drawing the required energy from power supply system 125. It is appreciated that AHU 350 represents one type of mechanical cooling, among other available types than can be presented in different embodiments. Further, while a secondary mechanical source of cooling is provided within the example VCCS 300, it is appreciated that in one or more alternate embodiments, no such secondary cooling systems are provided. With these alternate embodiments, only velocity based cooling is available and IT equipment 120 is throttled and/or placed in sleep mode whenever the transport vehicle stops moving at a sufficient velocity to support the cooling of IT equipment 120 using only the outside air (i.e., ram air cooling).

In an alternate embodiment, indicated by FIG. 3B, VC MDC 100 does not include an AHU or other auxiliary cooling system and instead relies solely on velocity-generated ram air cooling of the IT equipment 120 during vehicle mobility. Additionally, VC MDC 100 relies on external cooling options (e.g., external AHUs) when VC MDC 100 is stationary, such as when parked at a docking facility (see FIG. 12). With this embodiment, operation of the IT equipment is throttled or paused whenever the transport vehicle goes into a parked, non-moving or slow moving mode (i.e., low velocity). As the velocity of the vehicle increases, the level of processing then increases, up to a maximum allowable processing level. The amount of processing provided by IT equipment 120 takes into consideration the amount of available power and the heat removal efficiency of VCCS 300 with the ingested ram air at the current velocity or future velocity, as predicted by airflow controller 310 or management IHS 600.

Referring now to FIG. 6, there is illustrated an example management IHS 600. Management IHS 600 performs the management functions that control a host of MDC processes including an amount and level/rate of processing performed by IT equipment 120, power capping and power distribution/allocation, data ingestion and usage during transportation, temperature control with VCCS 300, and other functions on board VC MDC 100. While shown as a separate module/component within IT compartment 110, is appreciated that management IHS 600 (i.e. the functionality provided by management IHS 600) can be provided by one or more components of IT equipment 120 within IT rack 115. It is further appreciated that all of the above functionality attributed to airflow controller 310 can be implemented as and executable module within management IHS 600. In this embodiment, the telemetry data from the various sensors would be provided to management IHS 600, and management IHS would then execute management firmware 620 to trigger the implementation of certain responsive processes and operations within VC MDC. For example, management IHS 600 would trigger transmission of the appropriate control signals to intake actuator 330 to set the open/close position of ingress/intake damper 130 in order to control an amount of outside air that enters VC MDC 100.

For purposes of this disclosure, an information handling system, such as IHS 600, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 6, management IHS 600 includes one or more processor(s) 605 coupled to system memory 610 via system interconnect 615. System interconnect 615 can be interchangeably referred to as a system bus, in one or more embodiments. Also coupled to system interconnect 615 is local storage 622 within which can be stored one or more software and/or firmware modules and/or data (not specifically shown). In one embodiment, local storage 622 can be hard drive or a solid-state drive. The one or more software and/or firmware modules within local storage 622 can be loaded into system memory 610 during operation of management IHS 600. As shown, system memory 610 can include therein a plurality of software and/or firmware modules including basic input/output system (BIOS) 612, operating system (O/S) 614, application(s) 616, virus protection application 617, storage controller/data management and integration (DMI) module 618, and firmware (F/W) 620.

In one or more embodiments, BIOS 612 comprises additional functionality associated with unified extensible firmware interface (UEFI), and is thus illustrated as and can be more completely referred to as BIOS/UEFI in these embodiments. The various software and/or firmware modules have varying functionality when their corresponding program code is executed by processor(s) 605 or other processing devices within IHS 600.

Figure 12:
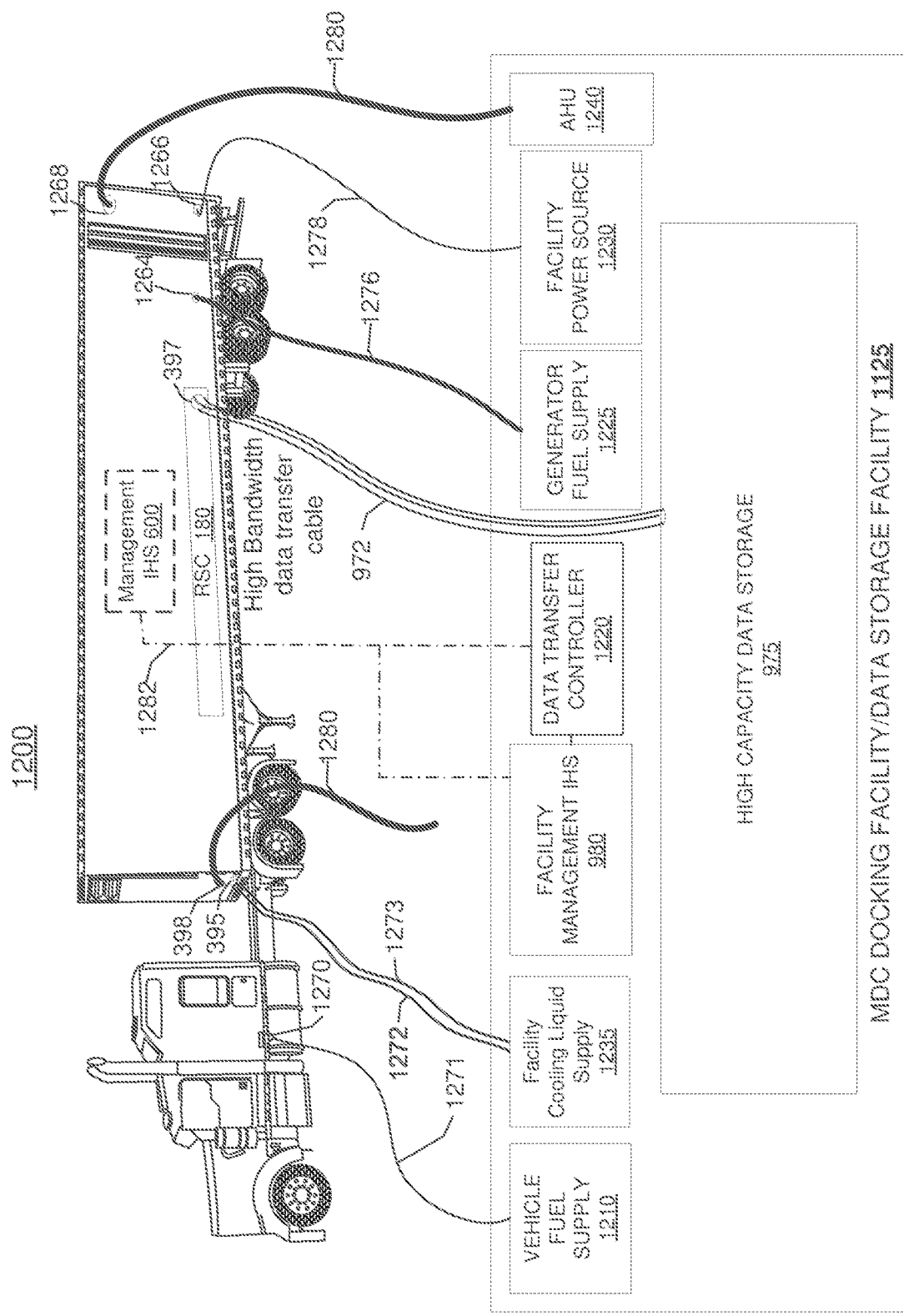
FIG. 12 is a block diagram representation of a data storage facility at which VC MDC docks and the supporting structures provided thereat, according to one or more embodiments.

In one embodiment, firmware 620 includes a power control module that provides a series of control algorithms that determine which components of IT equipment 120 receives power, the amount of power allocated to IT equipment 120 and other components within VC MDC 100, and other processes related to the use and/or allocation of the limited amounts of power within VC MDC 100 during transportation of VC MDC 100. Firmware 620 is a collective name utilized herein to reference the collection of various control modules and algorithms that are executed by management IHS 600 to enable and/or support operation of VC MDC 100 during transportation and docking cycles thereof. The term docking cycle refers to a period when VC MDC 100 is stationary at one or more locations at which VC MDC 100 connects with a data consumer or a data supplier. FIG. 12, described below, illustrates an example period during the data processing cycle in which VC MDC 100 is stationary (i.e., not moving to generate ram air effects for cooling) at a docking location.

Referring again to FIG. 6, management IHS 600 further includes one or more input/output (I/O) controllers 630 which support connection by, and processing of signals from, one or more connected input device(s) 632, such as a keyboard, mouse, touch screen, or microphone. Additionally, in one embodiment, input devices further include telemetry sensors/devices 633, such as those presented in FIG. 3. As previously stated, management IHS 600 can provide the functionality of air flow controller 310 as one of the modules within firmware 620. Alternatively, management IHS 600 can be communicatively coupled to air flow controller 310.

I/O controllers 630 also support connection to and forwarding of output signals to one or more connected output devices 634, such as a monitor or display device or audio speaker(s). Additionally, when management IHS 600 assumes/performs the role of air flow controller 310, management IHS 600 is also communicatively connected to actuators (generally actuators 635) for intake damper 130 and egress dampers 140*a*, 140*b*.

Additionally, in one or more embodiments, management IHS 600 includes a remote access controller (RAC) 650. RAC 650 is in communication with processor(s) 605 and system memory 610 via system interconnect 615. RAC 650 provides management functions that allow a remotely connected administrator to deploy, monitor, manage, configure, update, troubleshoot and remediate management IHS 600. RAC 650 is also coupled to, or includes, RAC memory 652. RAC 650 is also communicatively coupled to one or more network interface devices (NID) 680 via a sideband bus 654.

RAC 650 can monitor and control the operation of management IHS 600 and other systems and devices communicatively coupled to IHS 600. RAC 650 can also perform configuration and remote control of other connected IHSs. Certain software and/or firmware modules stored in RAC memory 652 can be executed by RAC 650. RAC 650/RAC memory 652 includes specific firmware that enables RAC 650 to perform various functions described herein. RAC 650 can contain components that control specific operations of IHS 600 such as power and thermal management. In one embodiment, RAC 650 can monitor and record the instantaneous and average power usage of IHS 600 and provide power data to other IHSs and computers.

IHS 600 further comprises NID 680 that is communicatively coupled to system interconnect 615. NID 680 enables IHS 600 to communicate and/or interface with other devices, services, and components that are located external to IHS 600. These devices, services, and components can interface with IHS 600 via an external network, such as example network 690, using one or more communication protocols. Network 690 can be a local area network, wide area network, personal area network, and the like, and the connection to and/or between network and IHS 600 can be wired or wireless or a combination thereof. It is appreciated that while VC MDC 100 is mobile, the connection to network 690 would be for a wireless medium. NID 680 is therefore assumed to incorporate a wireless antenna and transmission system within and/or coupled to management IHS 600. FIG. 3 provides an example wireless transceiver 370 that can provide the wireless connectivity for VC MDC 100 and management IHS 600. For purposes of discussion, network 690 is indicated as a single collective component for simplicity. However, it is appreciated that network 690 can comprise one or more direct connections to other devices as well as a more complex set of interconnections as can exist within a wide area network, such as the Internet.

High Capacity, Secure Access, Mobile Storage Exchange System

FIG. 6 also illustrates high capacity mobile data storage system (MDSS) 602 communicatively coupled to management IHS 600. MDSS 602 includes a bank of RDSDs 385 communicatively coupled to high capacity storage 625, which is further communicatively coupled to storage controller 670. As introduced in the descriptions of FIGS. 1B, 2B and 3A, VC MDC 100 includes storage compartment 180 (FIG. 1B) with access/cover panel 187 that serves as a security door protecting access to RDSDs 385. As further illustrated by FIGS. 7A-7B, the bank of RDSDs 385 are divided up into separate blocks, with each block having an assigned security access panel 380 that controls access to and removal and/or insertion of each RDSD 385 within the corresponding block of RDSDs 385. The full complement of components within VC MDC 100 that provides the functionality of MDSS is collectively illustrated in FIG. 9.

Figure 7A:
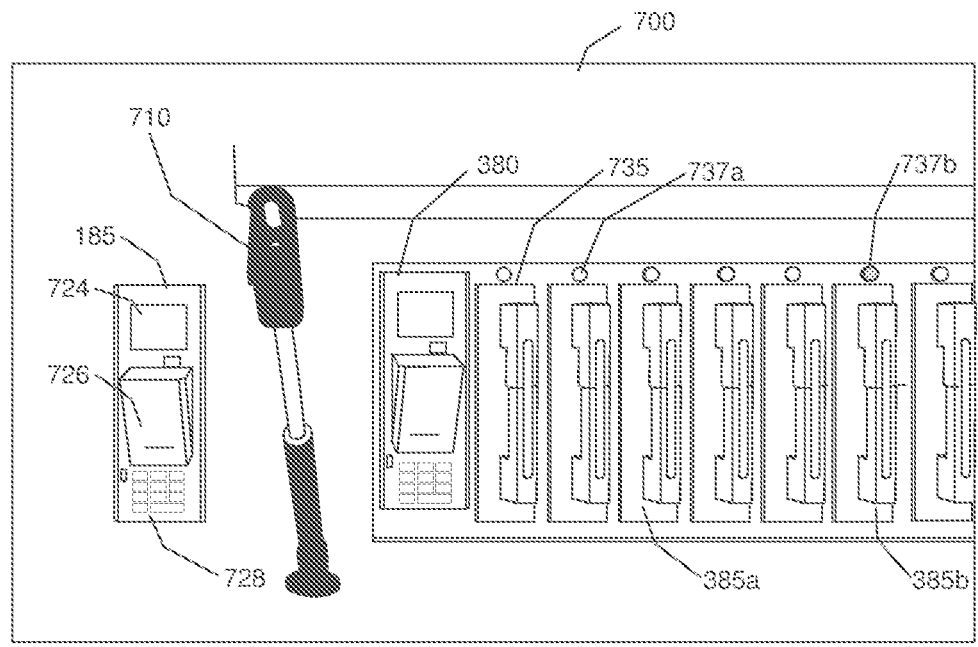
FIGS. 7A and 7B illustrate two interior views of a storage compartment, identifying two security access pads, status LEDs, and removable storage devices, in accordance with one embodiment.
Figure 7B:
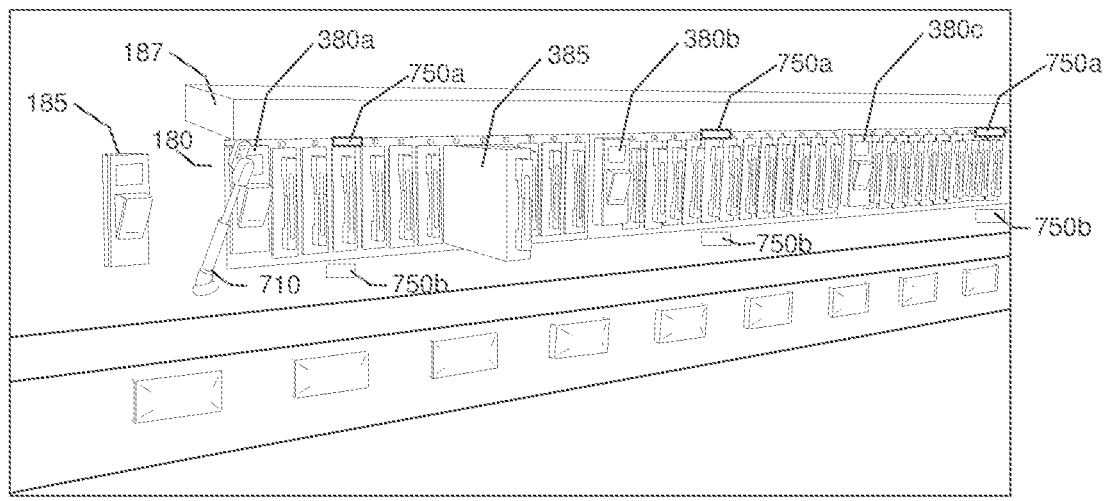

Referring now to FIGS. 7A-7B, there are illustrated two views of the bank of RDSDs 385. FIG. 7A provides a close-up interior view 700 of the removable storage device compartment 180. As shown, storage compartment 180 has associated access panel 187. Storage compartment also includes an exterior security access pad 185, which includes display 724, card reader 726, and keypad 728. Storage compartment also includes an interior security access pad 380, which is similarly configured to exterior security access pad 185. As further shown by FIG. 7B, RDSDs 385 are divided into blocks, with each block having assigned security access pad 380*a-c*. Each RDSD 385 is inserted into a separate slot 735 and each slot 735 and/or RDSD 385 has a corresponding status LED 737 associated therewith. In one embodiment, status LED 737 identifies when a particular RDSD 385 can be removed from (and/or a replacement RDSD inserted into) the corresponding slot 735. In FIG. 7A, one LED 737*b* is shown as illuminated, indicating the availability of the particular RDSD 385 for removal and/or exchange. Accordingly, FIG. 7B is presented showing a corresponding one of the RDSD 385 in an extended position for removal or insertion, in accordance with one embodiment. FIGS. 7A-7B also illustrates a pneumatic mechanical handle or locking mechanism 710 that is utilized to open access panel and maintain access panel in an open state until manually or electronically closed. Also, locking mechanism 750*a-b* comprised of a male locking mechanism 750*a* and a female locking mechanism 750*b* are provided. Locking mechanism 750 keeps access panel 187 locked until/unless a correct security code or keycard is provided at security access pad 185. While shown as a latching type lock, it is appreciated that other types of locking mechanism 750 can be utilized to secure access panel 187 to storage compartment 180.

Figure 8A:
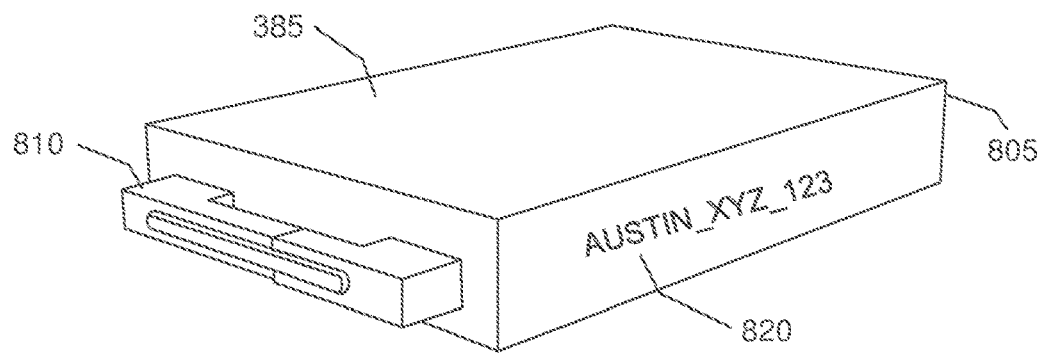
FIGS. 8A-8C provide block diagram illustrations of the configuration of a removable data storage device (RDSD), in accordance with one or more embodiments.
Figure 8B:
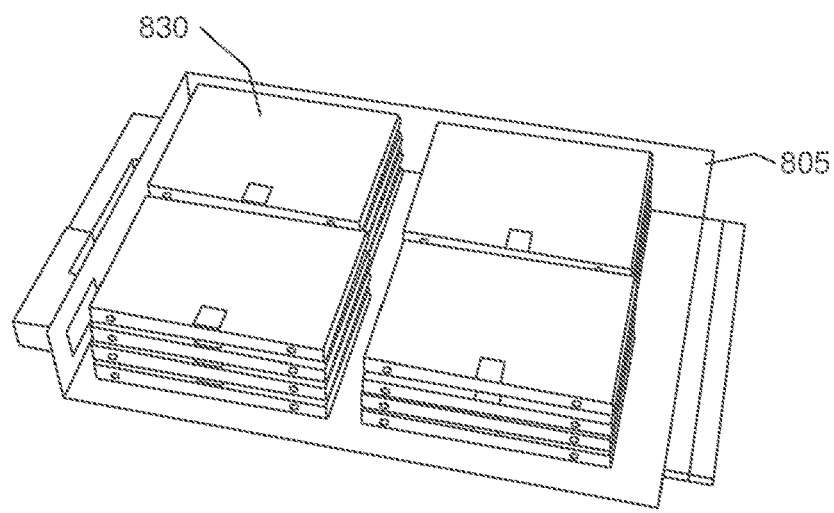
Figure 8C:
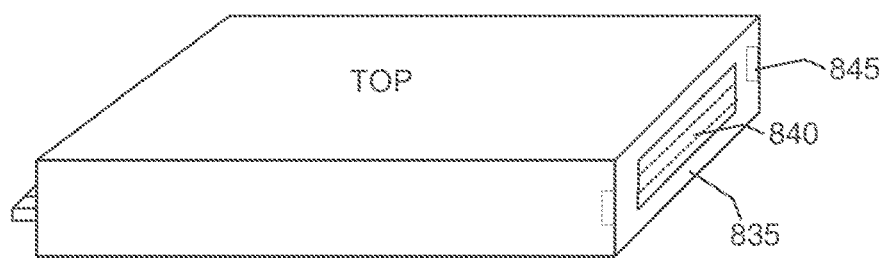

FIGS. 8A-8C present different interior views of an example RDSD 385. RDSD 385 includes an exterior casing 805 surrounding a plurality of storage disks/modules 830. Data is stored on storage disks/modules 830 during standard data capturing operation involving RDSD 385. RDSD 385 also includes handle 810 supporting portability of RDSD 385. Handle 810 is also utilized to manually insert (via a pushing force) or remove (via a pulling force) RDSD 385 from corresponding slot 735 (FIG. 7A). In one embodiment, each RDSD 385 has a unique identifier 820 located on the exterior casing 805. As further provided by FIG. 7C, RDSD 385 includes rear panel 835 with a data communication port 840 incorporated therein. Data communication port 840 enables RDSD 385 to be communicatively coupled to a receiving port located at the back of each slot 735. Rear panel 835 also includes one or more latching affordances 845 that enables RDSD 385 to be securely locked into the receiving slot 735, preventing removal of RDSD 385 unless a verified authentication code or keycard is entered at corresponding access pad 380.

Figure 9:
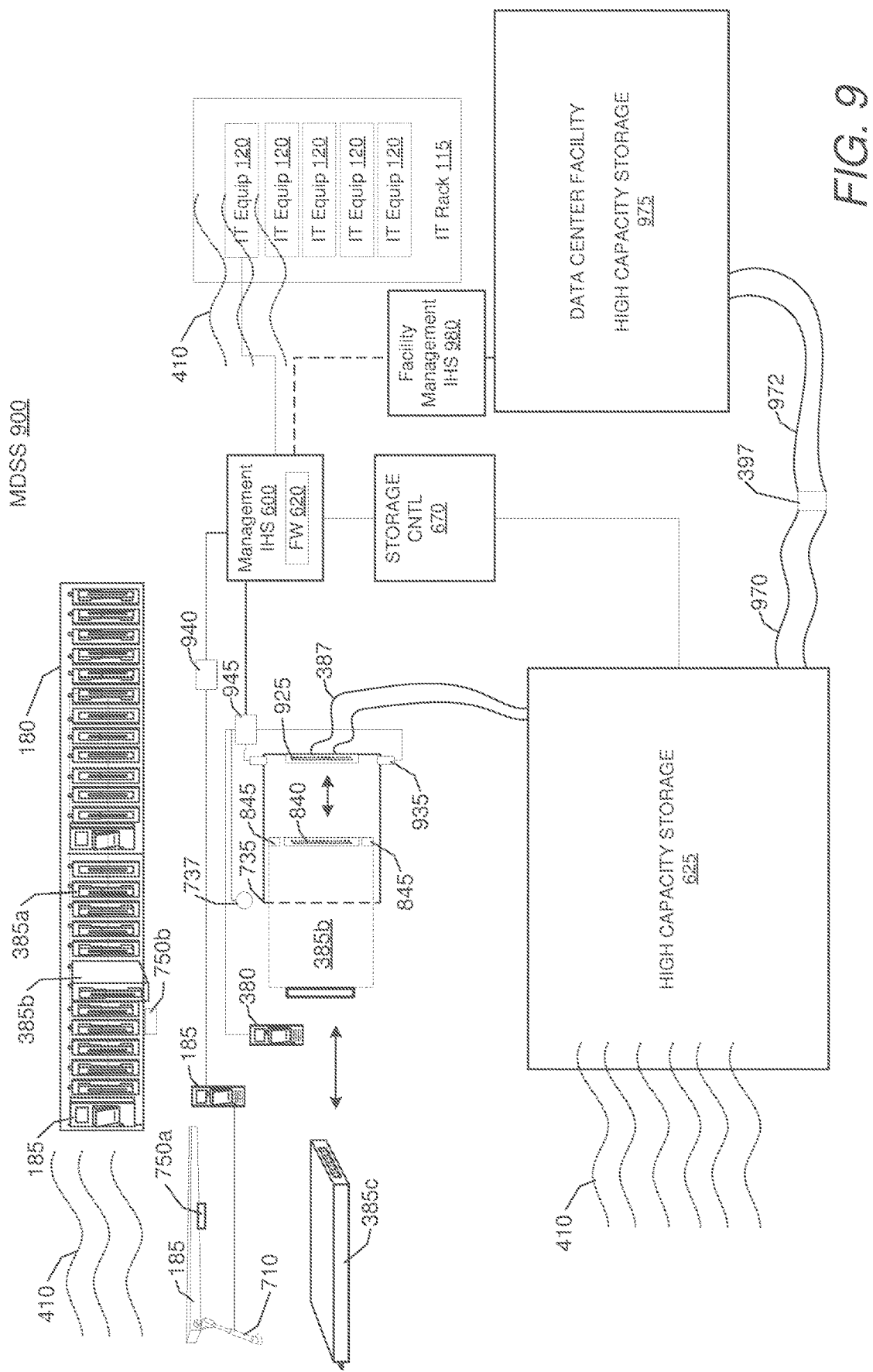
FIG. 9 illustrates an example mobile data storage subsystem (MDSS) of a MDC supporting use of RDSDs for data collection and exchange, in accordance with one embodiment.

Referring now to FIG. 9, there is illustrated an example of the components that comprise an MDSS. It is appreciated that as an initial implementation requirement, MDSS 900 includes VC MDC 100 that includes a volumetric container 105 having at least one IT equipment 120 operating therein, the at least one IT equipment 120 including at least one information handling system (see IHS 600). MDSS 900 includes storage compartment 180 configured within the volumetric container 105 and accessible from an exterior of the volumetric container. Storage compartment 180 includes a plurality of individual storage slots 735 each providing a docking port 925 for connecting RDSD 385, the docking connection (925) enabling access, by one or more of the at least one IHS, to data stored on RDSD 385. Storage compartment 180 includes at least one RDSD 385 inserted into a first storage slot (735) of the plurality of storage slots. RDSD 385 is a removable high density storage device that facilitates rapid transfer of data to VC MDC 100 from edge data acquisition systems and eventually to a data center facility (see FIGS. 11 and 12).

MDSS 900 also includes on-board high capacity storage 625 and management IHS 600 that is communicatively coupled to the high capacity storage 625 and to each docking port 735 within corresponding storage device slot. Management IHS 600 executes a data management and integration (DMI) module 618 that configures the management IHS 600 to detect insertion of RDSD 385 into a docking port and coordinate a transfer of data from RDSD 385 to the on-board high capacity storage 625. DMI module 618 further configures management IHS 600 to, in response to detecting insertion of RDSD 385, initiating a security protocol to confirm the RDSD does not have corrupted data or malware. Initiating the security protocol can include running a virus scan (via execution of virus protection application 617) on RDSD 385 prior to transferring the data to the on-board high capacity storage 625. DMI module 618 further configures management IHS 600 to trigger at least one of the plurality of IT equipment 120 to initiate processing of the data retrieved from RDSD 385. Accordingly, collected data is automatically processed within the MDSS 900 while VC MDC 100 is moving around in the geographical area.

MDSS 900 also includes HBUS 387. The HBUS communicatively couples data connections within docking ports (925) the on-board high capacity storage 625 for efficient data upload from RDSD 385 inserted into slot 735 and communicatively coupled to docking port 925.

According to one aspect, and as further illustrated by FIG. 12, DMI module 618 further configures management IHS 600 to detect a connection of the on-board high capacity storage 625 with facility management IHS 980, confirm that the detected facility management IHS 980 is a verified data aggregation device, and enable/provide facility management IHS 980 access to retrieve, copy, and/or manipulate the data stored on on-board high capacity storage 625. To facilitate this transfer, MDSS 900 also includes: a high bandwidth download bus 970 communicatively coupled to high capacity on-board storage 625 and terminating into high bandwidth data download (HBDD) port 397. HBDD port 397 enables coupling to high bandwidth data bus (or data transfer cable) 972 to facilitate data download to high capacity storage 975. HBDD port 397 can be located on an exterior-surface of enclosure 105 for easier access and connectivity. This access also requires entry of a security access/authorization code at management IHS 600 before data can be accessed and/or downloaded.

MDSS 900 further includes storage access/cover panel 187 having a locking mechanism 710 and 750a/750b. In one embodiment, storage access panel 187 is a hinged door of storage compartment 180. Locking mechanism 710, 750a/750b is communicatively coupled to security access pad 185 (directly or indirectly through a separate access control system) that enables entry of access information by a user to open hinged door (187) and access an interior of storage compartment 180. The access to the interior of storage compartment 180 is provided only in response to receipt and verification of an entry of the access information at first security access pad 185. MDSS 900 also includes at least one second security access pad 380 communicatively coupled to a second locking mechanism 935 of each slot 735 and/or docking port 925. Second security access pad 380 enables a user to enter unique access/authentication data required to open locking mechanism 935 for a particular docking port 925 of the plurality of docking ports and thereby release a corresponding RDSD 385b held within the particular docking port 925. In one embodiment, second locking mechanism 935 interfaces with latching affordance 845 of RDSD 385 to securely hold RDSD 385 within storage device slot 735 once RDSD 385 is fully inserted into slot 735 and has engaged with docking port 925. As previously introduced, within the description, the collective group of RDSDs are referenced generally as RDSDs 385, with the first RDSD shown in a partially removed/inserted position being referenced as RDSD 385b, the inserted RDSDs being referenced as RDSD 385a, and a second RDSD being carried to the storage compartment 180 (as provided in FIG. 10) references as RDSD 385c.

In one embodiment, MDSS 900 also includes a visual indicator 737a/b associated with each slot 735 and/or docking port 925. Visual indicator 737 enables communication of a status related to one or more of slot 735, docking port 925, and/or storage device, RDSD 385. According to one embodiment, the status can be one from among (i) unlocked and ready for removal, (ii) ready for MDSM insertion, (iii) data transfer completed, (iv) storage device non-functional or corrupted. It is appreciated that other status signals can be provided by visual indicator 737. Within the illustrated embodiment, first visual indicator 737b is illuminated, while the remaining visual indicators 737a are not illuminated. In one embodiment, illumination of first visual indicator 737b indicates to the user that the corresponding RDSD 385b is currently unlocked and can be removed/replaced.

According to one embodiment, MDSS 900 further includes a security algorithm executed on the management IHS 600. The security algorithm configures one or more components of MDSS 900, and in particular, under the control of management IHS 600, to detect entry of an access request at second security access pad 380. The access request includes a unique access code for accessing a particular RDSD 385. The one or more components also compare the access request and unique access code to pre-established combinations of unique access codes and specific RDSDs (385) of the plurality of RDSDs. In response to verifying the combination of unique access code and specific RDSD 385 is a correct/confirmed combination, the locking mechanism controller unlocks the associated docking port (925) of the particular RDSD 385 and signaling (via visual indicator 737) an unlocked status of the particular RDSD 385, the unlocked status enabling physical removal of the particular RDSD 385*b* and insertion of a replacement RDSD 385*c* into the docking port.

Figures 10A, 10B:
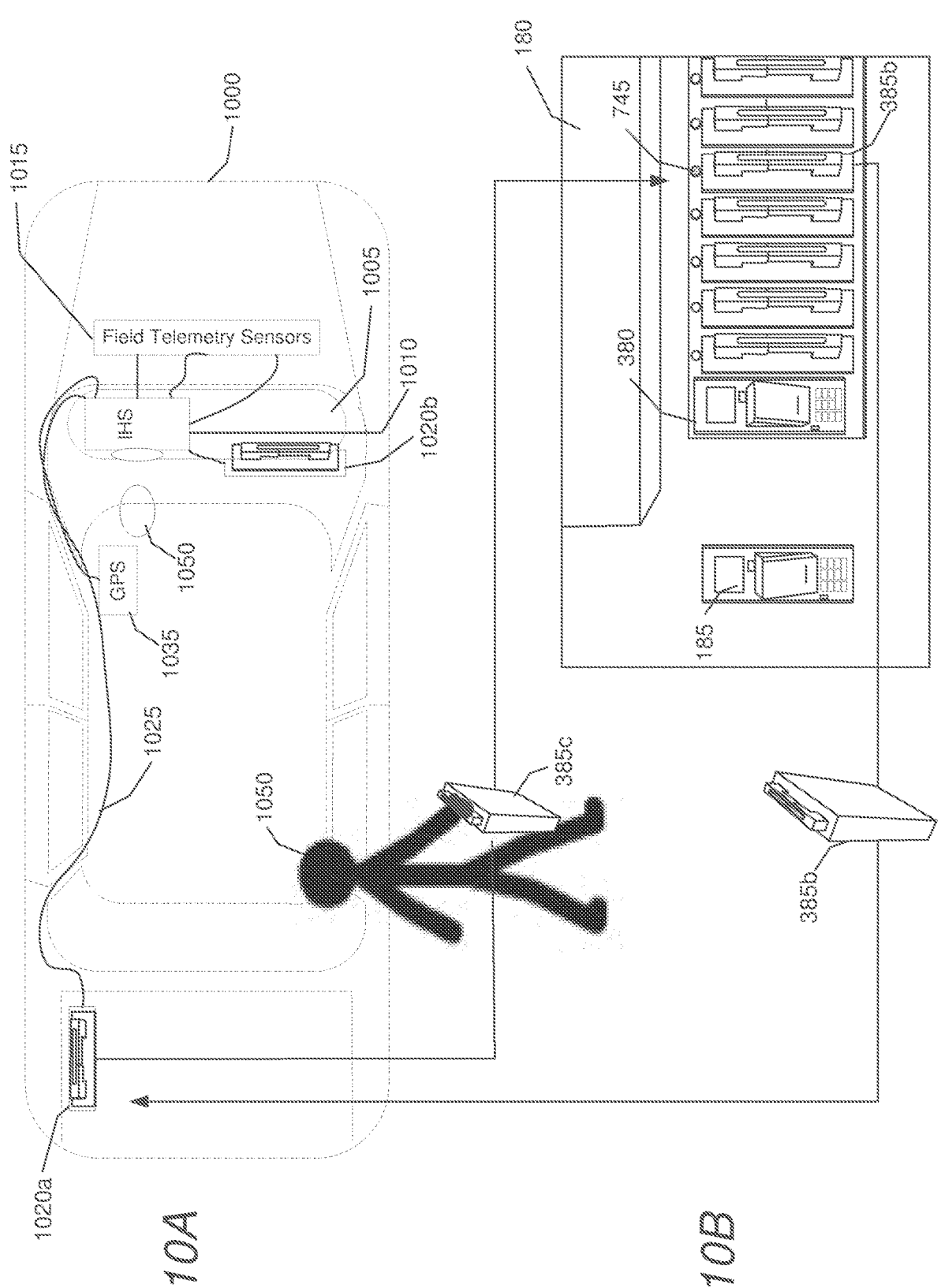
FIG. 10A illustrates an example data collection vehicle (DCV) equipped with a storage device compartment for inserting the RDSD to record data collected during operation of the vehicle, in accordance with one or more embodiments.
FIG. 10B-10C provide two diagrams illustrating the transfer of a RDSD from the DCV to the storage compartment within MDC, in accordance with one or more embodiments.
Figure 10C:
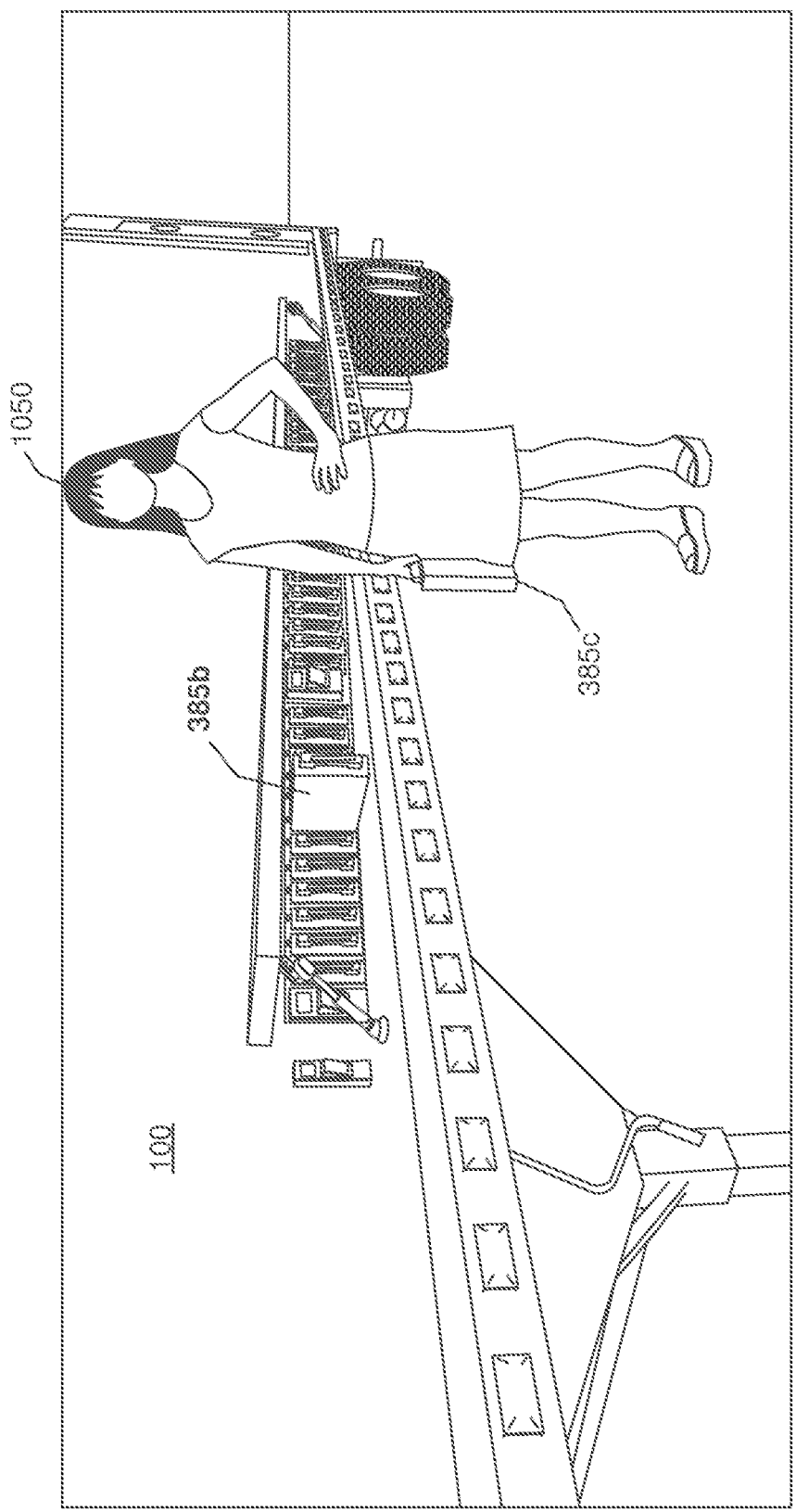

According to one embodiment, VC MDC 100 includes a ram air cooling system (see FIGS. 4 and 5), which provides a flow of cooling air 410 that cools RDSDs 385 within storage compartment and high capacity storage (HCS) 625 to maintain the RDSDs 385 and HCS 625 within an operating temperature range during data transfer and data processing operations. FIGS. 10A-10C illustrates an example exchange of a removable data storage cartridge from a mobile data collection vehicle to the VC MDC 100, in accordance with one or more embodiments. FIG. 10A specifically illustrates an example data collection vehicle (DCV) 1000 equipped with a storage drive compartment 1020 for inserting RDSD 385*c* to record data collected during operation of DCV 1000, in accordance with one or more embodiments. As shown DCV 1000 includes DCV IHS 1010 communicatively coupled to a plurality of field telemetry sensors 1015 and global positioning system (GPS) receiver 1035 (which can be included within field telemetry sensors 1015 in other embodiments). Field telemetry sensors 1015 are illustrated collectively as a single block of sensors. These sensors can include, but are not limited to, velocity sensor, location sensor, temperature sensor, humidity sensor, elevation sensor, pressure sensors gyroscopic sensor, distance sensor, visual sensors (e.g., cameras), audio sensors (e.g., microphones), and others. The sensors can be located both inside and outside of DCV 1000. DCV 1000 includes operator/driver 1050 controlling DCV 1000 via one or more vehicle control affordances, such as steering wheel 1055. In an alternate embodiment, DCV 1000 is a self-driving vehicle and does not include a human operator/driver within DCV 1000.

First storage drive compartment 1020*a* containing RDSD 385*c* is illustrated within the trunk of DCV 1000. A secondary storage drive compartment 1020*b* is shown below dash board 1005 on the passenger side of the DCV 1000. However, it is appreciated that the actual location of storage compartments may be different in each vehicle. Storage drive compartment 1020*a/b* includes a receiving slot and a docking port connector, similar to those illustrated in FIG. 9. When RDSD 385*c* is fully inserted into the receiving slot, data communication port 840 of RDSD 385*c* couples to docking port connector (see 925, FIG. 9), which is communicatively coupled to DCV IHS 1010 via connecting cable 1025. DCV IHS 1010 enables data collected by telemetry sensors to be stored to RDSD 385*c* while DCV 1000 is moving around in a geographical area. It is appreciated that DCV IHS 1010 may include a display device (not shown) that may be incorporated into dash board 1005, in one embodiment. DCV IHS 1010 may provide docking operator/driver 1050 with information about a status of RDSD 385*c* (e.g., how full the drives are) and/or locations and/or times for intersecting with VC MDC 100 or with a RDSD exchange point within the geographical area.

As shown by FIGS. 10B and 10C, driver/operator 1050 of DCV 1000 has removed RDSD 385*c* and is walking RDSD 385*c* over to storage compartment 180 of VC MDC 100. An authorized user (who may also be driver/operator 1050) would then enter the required security access codes at security access pad 1085 to open access panel 187 of storage compartment 180. Once driver 1050 gains access to the interior of storage compartment 180, driver again enters the required unique access code at second security access pad 380 to unlock one of the RDSDs 385. In one embodiment, the specific RDSD 385 that is unlocked can be associated with the particular unique access code that is entered by driver 1050. In another embodiment, the specific RDSD 385 is selected based on a first-in first-out (FIFO) algorithm executed by management IHS 600. In another embodiment, the specific RDSD is randomly selected from among the RDSDs whose data has already been downloaded. The drives of the empty RDSDs are then cleaned of residual data and prepped by management IHS 600 for re-assignment to a DCV. It is appreciated that management IHS 600 will only unlock a presently inserted RDSD if/when that RDSD has completed its data download and subsequent drive cleaning cycle. As shown by FIG. 10B, once the exchange of RDSD 385*c* for empty/cleaned RDSD 385*b* has been completed, driver 1050 then inserts RDSD 385*b* into storage drive compartment 1020*a*. DCV IHS 1010 then begins storing collected data to RDSD 385*b* while DCV 1000 resumes operation within the geographical area.

Figure 11:
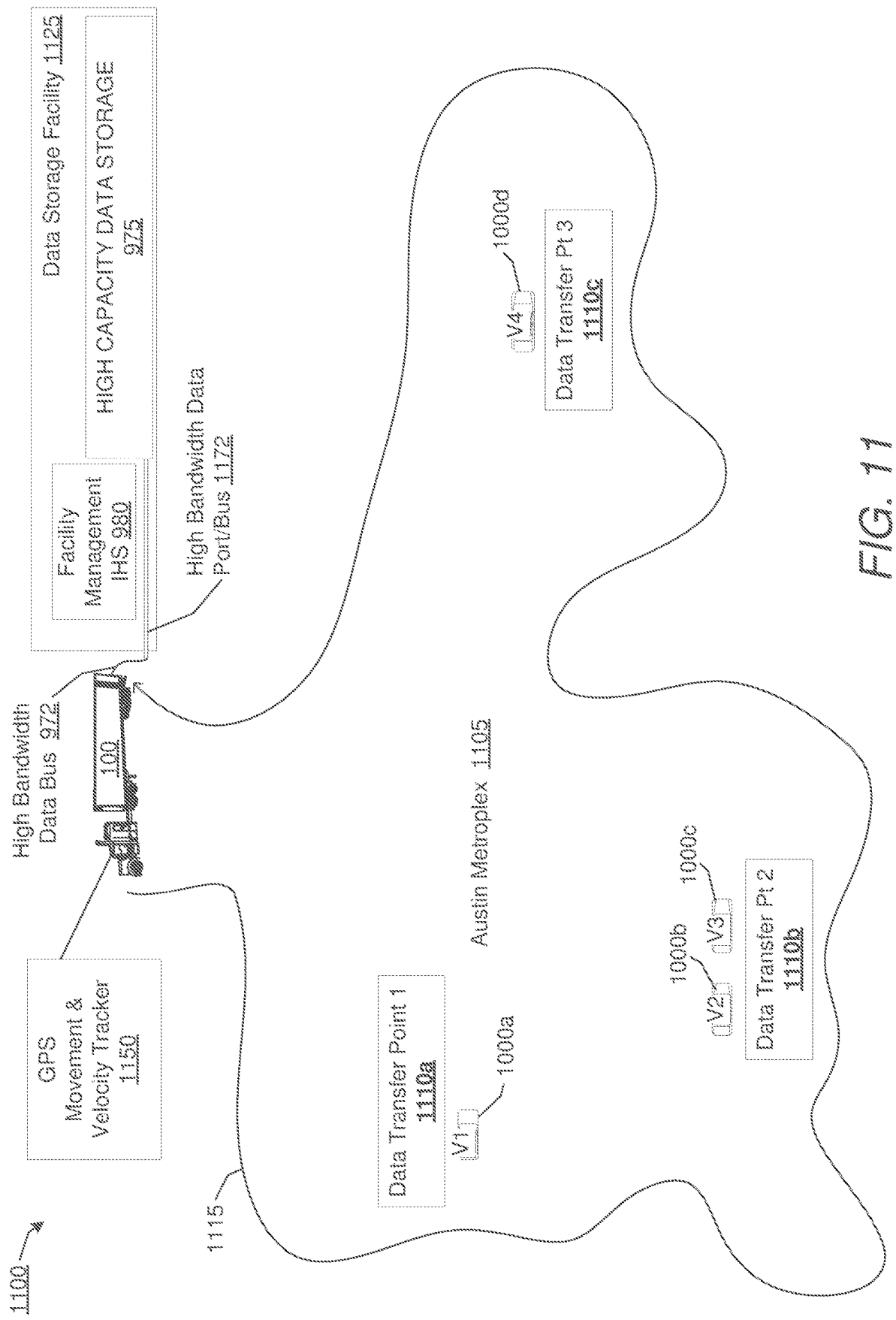
FIG. 11 illustrates an example geographical area with a data collection and transportation route utilized by the VR MDC to collect data from multiple in-service vehicles and deliver data to a data storage facility, in accordance with one or more embodiments.

FIG. 11 illustrates an example geographical area 1105 with a data collection and transportation route 1115 within which VC MDC operates to collect data from multiple in-service DCVs 1000, perform data processing while travelling along the route 1115, and deliver the collected and processed data to data storage facility 1125, in accordance with several embodiments. Geographical area 1105 is illustrated as the Austin Metroplex, within which VC MDC 110 operates. Geographical area 1105 includes a plurality of data transfer points, of which data transfer points 1, 2, and 3 1110*a-c* are shown as example data exchange locations along a specific route 1115 travelled by VC MDC 100. The data exchange processes illustrated in FIGS. 10*a*-10*c* are performed at one or more of data transfer points 1110*a-c*. As shown, one or more DCVs 1000*a-d* rendezvous with VC MDC 110 at the specific data transfer points 1110*a-c*. The specific route 1115 is presented as the continuous line that connect the various data transfer points 1110*a-c* and begins/ends at data storage facility 1125.

Turning now to FIG. 11 and with reference to FIG. 12, there is illustrated an example docking environment 1100 where VC MDC 100 is docked at (i.e., in a stationary position and not generating ram air for cooling) and interfaced/connected with components and/or services provided by MDC docking facility, which, for simplicity, doubles as data storage facility 1125. As presented herein, data storage facility 1125 includes facility management IHS 980 and high capacity storage 975 that receives a download of data provided by VC MDC 100. In the illustrated embodiment, as a MDC docking facility, data storage facility 1125 also includes vehicle fuel supply 1210 (FIG. 12), facility management IHS 980, coupled to and/or included in data transfer controller 1220, generator fuel supply 1225, facility power source 1230, facility cooling liquid supply 1235, and facility AHU 1240. In order for VC MDC 100 to support connection to and/or by the various components of data storage facility 1125 (as presented within docking environment 1200), VC MDC 100 is configured with a plurality of connecting or receiving affordances. These affordances include vehicle fuel tank 1270, secondary air intake 398, cooling liquid external connectors 395, data transfer port 397, generator fuel tank 1264, external power plug-in receptacle 1266, and AHU cooling air intake 1268.

It is appreciated that the exact location of these various affordances can vary from configuration and/or design of each VC MDC 100, and that not all of the affordances are required and/or are present in some embodiments of VC MDCs. Further, it is appreciated that the data storage facility 1125 can, in alternate embodiments, be designed with less or more support services/components than illustrated, with the primary services being high bandwidth transfer of collected data and access to an external cooling source (1240).

FIG. 12 further illustrates example connectivity between each component of data storage facility 1125 with corresponding affordances on VC MDC 100/200. The illustrated connecting components include fuel hoses 1271 and 1276, facility cooling fluid intake and outflow conduits 1272, 1273, cooling air intake conduit 1280, high-bandwidth data transfer cable 972, and power supply conduit 1278. The respective functionality of each of these connecting components can be determined based on the components within data storage facility 1125 to which they are coupled. FIG. 12 illustrates that AHU 1240 can be connected to VC MDC 100 at different locations to provide cooling air into VC MDC 100. Facility cooling liquid supply 1235 (e.g., cold water) can also be pumped into VC MDC 100 through intake and outflow conduits 1272, 1273 to provide cooling via LTA HE 390 (FIG. 3A). With the availability of cooling air provided while VC MDC 100 is docked and/or stationary, IT equipment 120 within VC MDC receives the necessary cooling that enables IT equipment 120 to continue processing operations in the absence of the ram air cooling that would otherwise be provided during forward movement of VC MDC 100 above a minimum threshold velocity.

Notably, high-bandwidth data transfer cable 972 enables the offloading of large amounts of data stored on storage modules within storage compartment 180. The transfer of data, and the amount of cooling air provided, and the amount of processing operations allowed to be performed by IT equipment 120 are controlled by communication between management IHS 600 and facility management IHS 980 and/or data transfer controller 1220. Communication link 1282 is first established between management IHS 600 and facility management IHS 980 to enable efficient data transfer and throttled IT equipment operations during the time VC MDC 100 is docked at data storage facility 1125.

Figure 13:
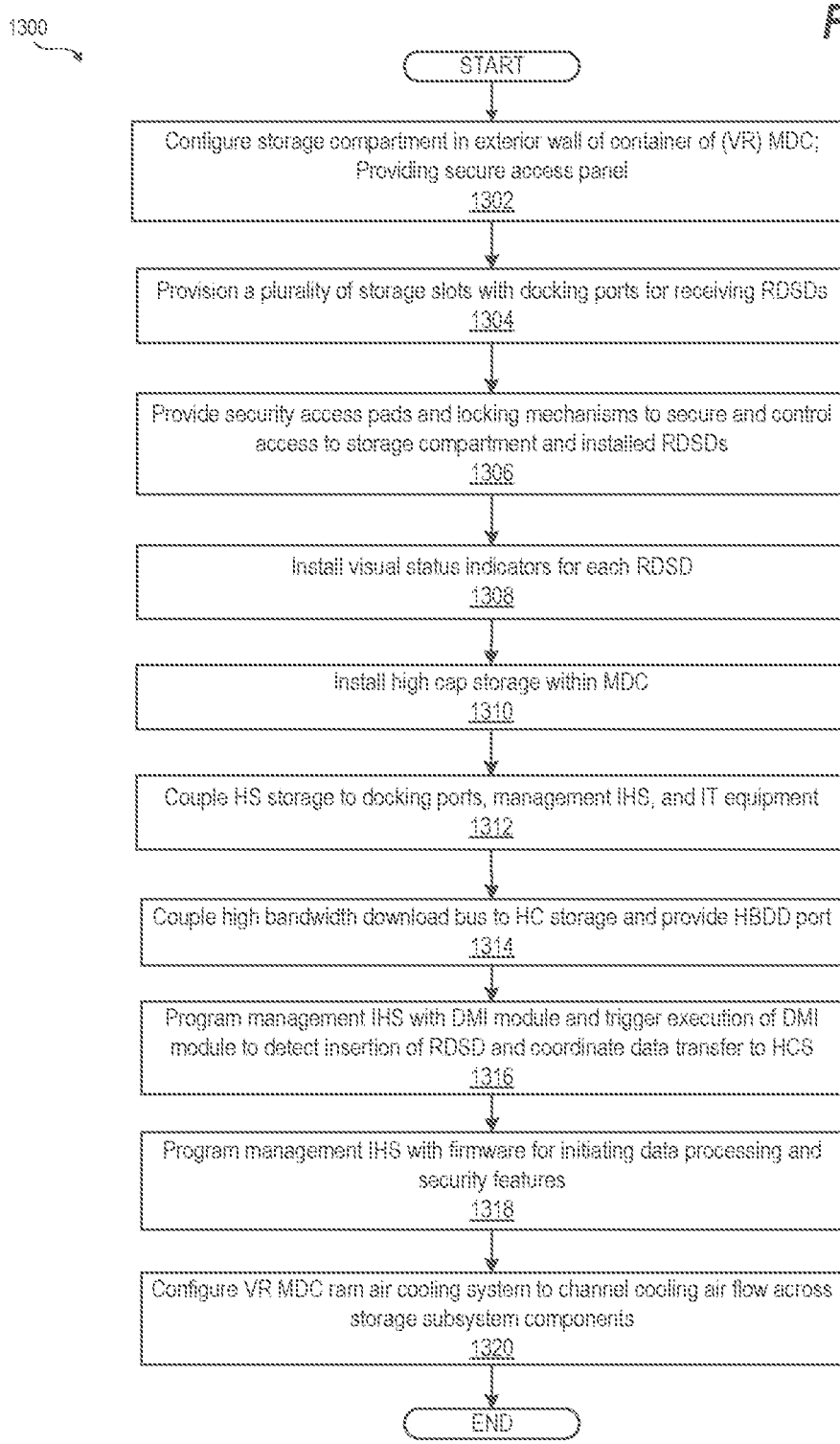
FIG. 13 is a flow chart of the method for provisioning an MDC with a MDSS to enable mobile data collection and processing, in accordance with one or more embodiments.
Figure 14:
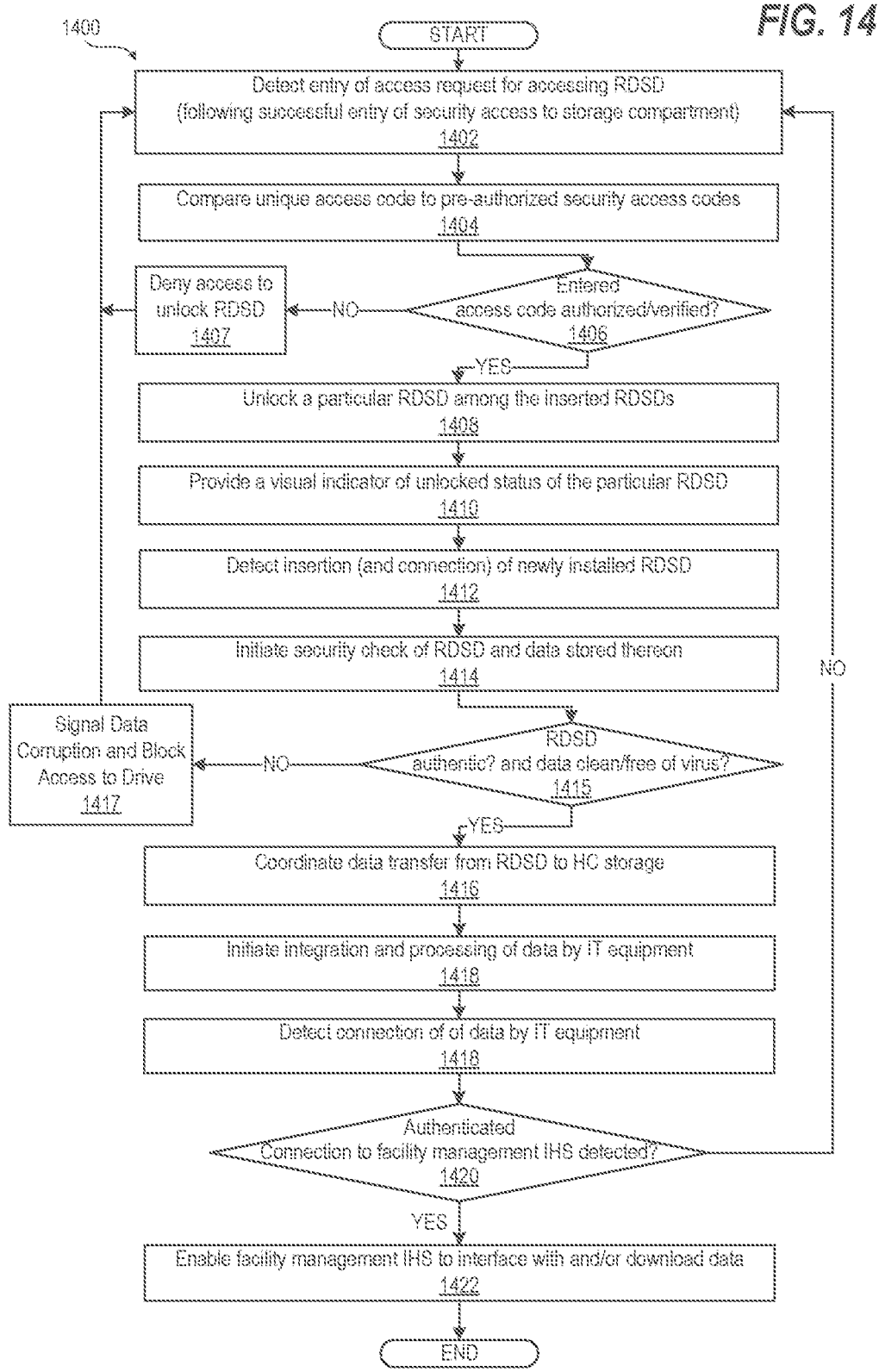
FIG. 14 is a flow chart of the method for accessing the storage compartment and enabling data transfer from an inserted RDSD to a high capacity data storage located within VR MDC, in accordance with one or more embodiments.

FIGS. 13-14 provide flow charts illustrating example methods for provisioning and utilizing a mobile data storage subsystem that includes removable storage drives for real-time data collection by in-service data collection vehicles and subsequent data exchange with VC MDC 100/200 moving within a geographical area, in accordance with one or more embodiments. Referring first to FIG. 13, there is illustrated method 1300 for provisioning an MDSS 900. Method 1300 begins at start block and proceeds to block 1302 which includes configuring a storage compartment within a volumetric container housing a VC MDC 100. Block 1302 also includes providing an access panel to access an interior of the storage compartment from an exterior of the volumetric container. Method 1300 also includes provisioning a plurality of individual storage slots within storage compartment, each storage slot including a docking port for connecting a RDSD (block 1304). Method 1300 includes providing a plurality of security access pads and locking mechanisms to control access to storage compartment and to installed RDSDs 385 (block 1306). Method 1300 includes installing visual status indicators 737 associated with each slot 735 and/or docking port 925 (block 1308).

Method 1300 further includes installing a high capacity storage 625 within the MDC (block 1310) and communicatively coupling the high capacity storage 625 to each docking port 735 via a HBUS (block 1312). High capacity storage 625 is also communicatively coupled to management IHS 600 and IT equipment 120, which accesses and processes data from high capacity storage 625 while VC MDC 100 is moving. In one embodiment, method includes providing a high bandwidth download bus 970 communicatively coupled to high capacity (HC) on-board storage 625 and terminating into high bandwidth data download (HBDD) port 397 (block 1314).

Method 1300 includes programming management IHS 600 to execute a data management and integration (DMI) module 618 that configures management IHS 600 to detect insertion of a RDSD into a docking port and coordinate a transfer of data from RDSD 385 to the on-board high capacity storage (block 1316). Method 1300 also includes programming management IHS 600 with additional firmware that triggers at least one of the plurality of IT equipment 120 to initiate processing of the data retrieved from RDSD 385 and that supports data download to an external data storage facility 625 (block 1318). The additional firmware can also include a security algorithm.

When MDC is a VR MDC method can optionally include configuring the rain air cooling system (see FIGS. 4 and 5) to provide a flow of cooling air 410 that cools the RDSDs 385 within storage compartment and HCS 625 to maintain the RDSDs 385 and HCS 625 within an operating temperature range during data transfer and data processing operations (block 1320).

Referring now to FIG. 14, there is provided method 1400 for mobile data collection and processing using components and features of MDSS 900. The various processes of method 1400 can be provided by management IHS 600 operating in conjunction with storage controller 670 and one or more security access controllers or modules (not shown). Method 1400 enables mobile collection and processing of in-field collected data. Method 1400 begins at start block and proceeds to block 1402 which provides detecting entry of an access request at a security access pad 185 of storage compartment 180. The access request includes a unique access code for accessing a particular RDSD from among multiple RDSDs 385 housed within storage compartment 180. Method 1400 includes comparing the access request and/or unique access code to pre-authorized security access codes (block 1404). Method 1400 then includes determining at decision block 1406 whether the entered access code is a valid/verified access code. In response to the entered access code not being verified, method 1400 includes denying access to unlock the RDSD (block 1407). Method can also provide additional security responses that are implementing to protect the drives from unauthorized access. In response to verifying the entered unique access code is a valid/verified access code, method 1400 includes unlocking a docking port to which a particular RDSD that is identified for removal is coupled (block 1408). Unlocking the docking port enables physical removal of the particular RDSD and insertion of a replacement RDSD into the docking port. Method 1400 also includes, in response to unlocking the docking port, signaling an unlocked status of the particular RDSD (block 1410). The signaling includes providing a visually detectable signal to indicate a current lock/unlock status of the particular RDSD and docking port. In one embodiment the signaling includes illuminating a light emitting diode (LED) to a first color associated with an unlock status, the LED providing a different illumination status while the docking port is locked with a RDSD coupled thereto.

Following the unlocking of the RDSD from the docking port, which enables removal of the currently installed RDSD, method 1400 includes detecting insertion of a next RDSD into the docking port (block 1412). In response to detecting insertion of the RDSD, method 1400 includes initiating a security protocol to check whether RDSD does not have corrupted data or malware (block 1414). The security protocol can include running a virus scan on the RDSD prior to enabling a transfer of the data to the on-board high capacity storage. Method 1400 also includes determining at decision block 1415 whether the RDSD is an authentic device and whether the RDSD and/or data is clean (free of viruses). In response to determining that the RDSD and/or data stored is not clean (e.g., contains a virus or malware or is corrupted), method 1400 includes generating a signal indicating the corrupted status of the RDSD and/or the data and blocking further access by or communication between the MDSS and the RDSD (block 1417). In one embodiment, MDSS may automatically eject the corrupted RDSD. In response to RDSD and data being evaluated as clean data, method 1400 includes coordinating a transfer of data from the RDSD to an on-board high capacity storage (block 1416). Method 1400 further includes triggering at least one of the IT equipment to initiate processing of data retrieved from the RDSD (block 1418). Accordingly, the data is automatically processed within the mobile data storage exchange system while the MDC is operating in the field.

Method 1400 also includes detecting a connection of the on-board high capacity storage with a facility management IHS (block 1420). If no such connection is detected, method 1400 returns to block 1402. In response to the detection, method 1400 includes confirming that the detected facility management IHS is a verified data aggregation device (block 1420). Method then includes enabling the facility management IHS access to retrieve, copy, and/or manipulate the data stored on the on-board high capacity storage (block 1422).

In one embodiment, prior to receiving the access request at block 1402, method 1400 includes receiving a first access code at a first access panel that controls an opening and closing of a door panel covering the storage compartment. Method 1400 then includes comparing the first access code to at least one unlock code for the first access panel of the storage compartment. Method 1400 further includes, in response to the first access code matching at least one unlock code, enabling opening of the first access panel and access to the storage compartment beneath the first access panel.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A mobile data storage exchange system comprising:
    a mobile data center (MDC) comprising a volumetric container having at least one IT equipment operating therein, the at least one IT equipment including at least one information handling system (IHS);
    a storage compartment configured within the volumetric container and accessible via an access panel from an exterior of the volumetric container;
    a plurality of individual storage slots within the storage compartment and accessible via the access panel from the exterior of the volumetric container, each storage slot providing a docking port for connecting a removable data storage device (RDSD), the docking port enabling access, by one or more of the at least one IHS, to data stored on the RDSD; and
    at least one RDSD inserted into a first storage slot of the plurality of individual storage slots.

2. The mobile data storage exchange system of claim 1; wherein the RDSD is a removable high density storage device that facilitates rapid transfer of data to the MDC from edge data acquisition systems and to a data center facility.

3. The mobile data storage exchange system of claim 2, further comprising:
    a first storage access panel having a locking mechanism, the storage access panel being a hinged door of the storage compartment, the locking mechanism communicatively coupled to a security access pad that enables entry of access information by a user to open the hinged door and access an interior of the storage compartment, wherein access to the interior of the storage compartment is provided only in response to receipt and verification of an entry of the access information at the first security access pad.

4. The mobile data storage exchange system of claim 2, further comprising:
    a second security access pad communicatively coupled to a locking mechanism of each docking port, the second security access pad enabling a user to enter unique access data required to open the locking mechanism for a particular docking port of the plurality of docking ports and release a corresponding RDSD held within the particular docking port.

5. The mobile data storage exchange system of claim 4, further comprising a security algorithm executed on the management IHS, the security algorithm configuring the data storage exchange system to:
    detect entry of an access request at the security access pad, the access request including a unique access code for accessing a particular RDSD;
    compare the access request and unique access code to pre-authorized unique access codes that allow access to remove and/or insert an RDSD of the plurality of RDSDs; and
    in response to verifying the entered unique access code matches one of the pre-authorized unique access codes, unlock the docking port of a particular RDSD and signaling an unlocked status of the particular RDSD, the unlocked status enabling physical removal of the particular RDSD and insertion of a replacement RDSD into the docking port.

6. The mobile data storage exchange system of claim 4, further comprising:
    a high capacity onboard storage;
    a high bandwidth upload system bus (HBUS) communicatively coupling data connections within the docking ports to the high capacity on-board storage for efficient data upload from the RDSD inserted into the docking port; and
    a high bandwidth download system port communicatively coupled to the high capacity on-board storage and which enables coupling to a high bandwidth data bus to facilitate data download to a facility storage, the HBDS port located on an exterior-surface of the container for easy access and connectivity.

7. The mobile data storage exchange system of claim 4, wherein the MDC is a velocity cooled (VC) MDC that comprises a ram air cooling system that provides a flow of cooling air across the storage compartment and the high capacity storage to maintain the RDSDs and HCS within n operating temperature range during data transfer and data processing operations.

8. The mobile data storage exchange system of claim 2, further comprising:
    a visual indicator associated with each docking port, the visual indicator enabling communication of a status related to the storage device, the status being one from among (i) unlocked and ready for removal, (ii) ready for MDSM insertion, (iii) data transfer completed, (iv) device non-functional or corrupted.

9. The mobile data storage exchange system of claim 1, further comprising:
    an on-board high capacity storage; and
    a management IHS that is communicatively coupled to the high capacity storage and to each docking port, the management IHS executing a data management and integration (ME) module that configures the management IHS to:
    detect insertion of a RDSD into a docking port; and
    coordinate a transfer of data from the RDSD to the on-board high capacity storage.

10. The mobile data storage exchange system of claim 9, wherein the DMI module further configures the management IHS to:
   in response to detecting insertion of the RDSD, initiating a security protocol to confirm the RDSD does not have corrupted data or malware, the security protocol including running a virus scan on the RDSD prior to transferring the data to the on-board high capacity storage.

11. The mobile data storage exchange system of claim 9, wherein the DMI module further configures the management IHS to trigger at least one of the IT equipment to initiate processing of the data retrieved from the RDSD, wherein data is automatically processed within the mobile data storage exchange system while the MDSS is operating in the field.

12. The mobile data storage exchange system of claim 9, wherein the DMI module further configures the management IHS to:
   detect a connection of the on-board high capacity storage with a facility management HIS;
   confirm that the detected facility management IHS is a verified data aggregation device; and
   enable the facility management IHS access to retrieve, copy, and/or manipulate the data stored on the on-board high capacity storage.

13. A method for enabling mobile collection and processing of in-field collected data, the method comprising:
   detecting entry of an access request at a security access pad of a storage compartment configured within a container housing of a mobile data center (MDC), the MDC having at least one IT equipment operating therein, the storage compartment being a part of a mobile data storage exchange system (MDSS) of the MDC, the access request including a unique access code for accessing a removable data storage device (RDSD) from among multiple RDSDs housed within the storage compartment;
   comparing the access request and unique access code to pre-authorized unique access codes that allow access to remove and/or insert an RDSD at the storage compartment; and
   in response to verifying the entered unique access code matches one of the pre-authorized unique access codes, unlocking the docking port of a particular RDSD and signaling an unlocked status of the particular RDSD, the unlocked status enabling physical removal of the particular RDSD and insertion of a replacement RDSD into the docking port.

14. The method of claim 13, further comprising, in response to unlocking the docking port, signaling an unlocked status of the particular RDSD.

15. The method of claim 14, wherein the signaling further comprises providing a visually detectable signal to indicate a current lock/unlock status of the particular RDSD and docking port.

16. The method of claim 14, further comprising illuminating a light emitting diode (LED) to a first color associated with an unlock status, the LED providing a different illumination status while the docking port is locked with a RDSD coupled thereto.

17. The method of claim 13, further comprising:
   detecting insertion of a RDSD into a docking port;
   in response to detecting insertion of the RDSD, initiating a security protocol to confirm the RDSD does not have corrupted data or malware, the security protocol including running a virus scan on the RDSD prior to enabling a transfer of the data to the on-board high capacity storage; and
   coordinating a transfer of data from the RDSD to an on-board high capacity storage.

18. The method of claim 13, further comprising triggering at least one of the IT equipment to initiate processing of data retrieved from the RDSD, wherein data is automatically processed within the mobile data storage exchange system while the MDC is operating in the field.

19. The method of claim 13, further comprising:
   detecting a connection of the on-board high capacity storage with a facility management IHS;
   confirming that the detected facility management IHS is a verified data aggregation device; and
   enabling the facility management IHS access to retrieve, copy, and/or manipulate the data stored on the on-board high capacity storage.

20. The method of claim 13, further comprising:
   receiving a first access code at a first access panel that controls an opening and closing of a door panel covering the storage compartment;
   comparing the first access code to at least one unlock code for the first access panel of the storage compartment; and
   in response to the first access code matching at least one unlock code, enabling opening of the first access panel and access to the storage compartment beneath the first access panel.

* * * * *

UNITED STATES PATENT AND TRADEMARK OFFICE
CERTIFICATE OF CORRECTION

PATENT NO. : 10,776,526 B2  
APPLICATION NO. : 15/962897  
DATED : September 15, 2020  
INVENTOR(S) : Austin M. Shelnutt and Edmond I. Bailey Page 1 of 1

It is certified that error appears in the above-identified patent and that said Letters Patent is hereby corrected as shown below:

In the Claims

Column 28, Line 63, Claim 9, after "integration" delete "(ME)".
Column 28, Line 63, Claim 9, after "integration" insert --(DMI)--.
Column 29, Line 20, Claim 12, after "management" delete "HIS".
Column 29, Line 20, Claim 12, after "management" insert --IHS--.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*